United States Patent
Yu et al.

(10) Patent No.: US 10,298,131 B2
(45) Date of Patent: May 21, 2019

(54) APPARATUS FOR CONTROLLING A SWITCHING DC-DC CONVERTER, SWITCHING DC-DC CONVERTER AND METHOD FOR CONTROLLING A SWITCHED DC-DC CONVERTER

(71) Applicant: Fraunhofer-Gesellschaft zur Foerderung der angewandten Forschung e.V., Munich (DE)

(72) Inventors: Zhe Yu, Henstedt-Ulzburg (DE);
Holger Kapels, Bad Oldesloe (DE);
Klaus F. Hoffmann, Hamburg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 15/952,584

(22) Filed: Apr. 13, 2018

(65) Prior Publication Data

US 2018/0287498 A1 Oct. 4, 2018

Related U.S. Application Data

(63) Continuation of application No. PCT/EP2016/074494, filed on Oct. 12, 2016.

(30) Foreign Application Priority Data

Oct. 13, 2015 (DE) .................... 10 2015 219 850

(51) Int. Cl.
*H02M 3/158* (2006.01)
*G05F 1/62* (2006.01)
*H02M 1/00* (2006.01)

(52) U.S. Cl.
CPC ....... *H02M 3/1582* (2013.01); *H02M 3/1584* (2013.01); *H02M 2001/0003* (2013.01); *H02M 2001/0058* (2013.01)

(58) Field of Classification Search
CPC ............ G05F 1/24; G05F 1/62; H02M 3/156; H02M 3/158; H02M 3/1582; H02M 3/1588
See application file for complete search history.

(56) References Cited

U.S. PATENT DOCUMENTS 6,166,527 A 12/2000 Dwelley et al.
7,605,576 B2 * 10/2009 Kanakubo ........... H02M 3/1582
323/225

(Continued)

FOREIGN PATENT DOCUMENTS

CH 699920 B1 5/2010
DE 102006005853 A1 8/2007

(Continued)

OTHER PUBLICATIONS

Jones, David C. et al., "Buck-Boost Converter Efficiency Maximization via a Nonlinear Digital Control Mapping for Adaptive Effective Switching Frequency", IEEE Journal of Emerging and Selected Topics in Power Electronics, IEEE, Piscataway, NJ, USA, vol. 1, No. 3, XP011527616, Sep. 1, 2013, pp. 153-165.

(Continued)

*Primary Examiner* — Gary L Laxton
(74) *Attorney, Agent, or Firm* — Perkins Coie LLP; Michael A. Glenn

(57) ABSTRACT

An apparatus for controlling a switching DC-DC converter with a first half-bridge circuit including a first switch and a second switch, with a second half-bridge circuit including a third switch and a fourth switch and with an inductance connected between the center taps of the first and the second half-bridge circuit includes, according to embodiments, a control unit that is configured to adapt, in dependence on an input voltage and an output voltage at the switching DC-DC converter, a switching frequency of the switches of the DC-DC converter, the duty cycles of the first and fourth switch and the time delay between switching on the first and the fourth switch. The control unit is configured to determine the switching frequency, the first duty cycle, the second duty cycle and the time delay based on an output current of the switching DC-DC converter.

13 Claims, 24 Drawing Sheets

(56) References Cited

U.S. PATENT DOCUMENTS

| | | | | |
|---|---|---|---|---|
| 8,305,055 | B2* | 11/2012 | Wu | G05F 1/10 |
| | | | | 323/259 |
| 8,564,259 | B2* | 10/2013 | Chen | H02M 3/1582 |
| | | | | 323/259 |
| 8,860,387 | B2* | 10/2014 | Kobayashi | H02M 3/1582 |
| | | | | 323/259 |
| 2004/0027101 | A1 | 2/2004 | Vinciarelli | |
| 2014/0146594 | A1 | 5/2014 | Hayakawa et al. | |
| 2016/0190932 | A1 | 6/2016 | Yu et al. | |

FOREIGN PATENT DOCUMENTS

| | | |
|---|---|---|
| DE | 102013218228 A1 | 3/2015 |
| WO | 2007090476 A2 | 8/2007 |

OTHER PUBLICATIONS

Waffler, Stefan et al., "A Novel Low-Loss Modulation Strategy for High-Power Bidirectional Buck + Boost Converters", IEEE Transaction on Power Electronics, Institute of Electrical and Electronics Engineers, USA, vol. 24, No. 6, XP011262259, Jun. 1, 2009, pp. 1589-1599.

Yu, Zhe et al., "High Efficiency Bidirectional DC-DC Converter with Wide Input and Output Voltage Ranges for Battery Systems", May 21, 2015, XP055335994. ISBN978-3-8007-3924-0, May 21, 2015, pp. 398-405.

\* cited by examiner

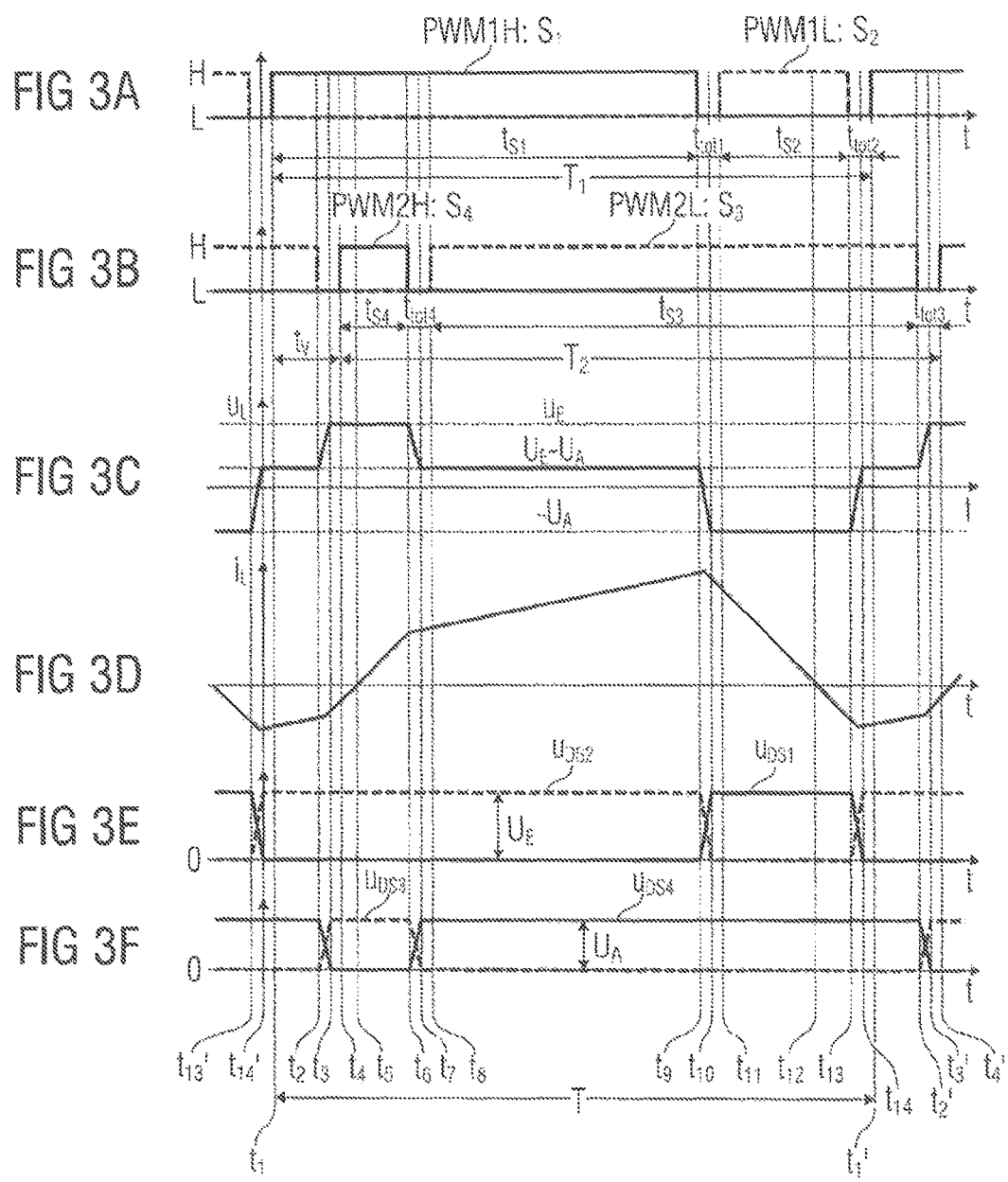

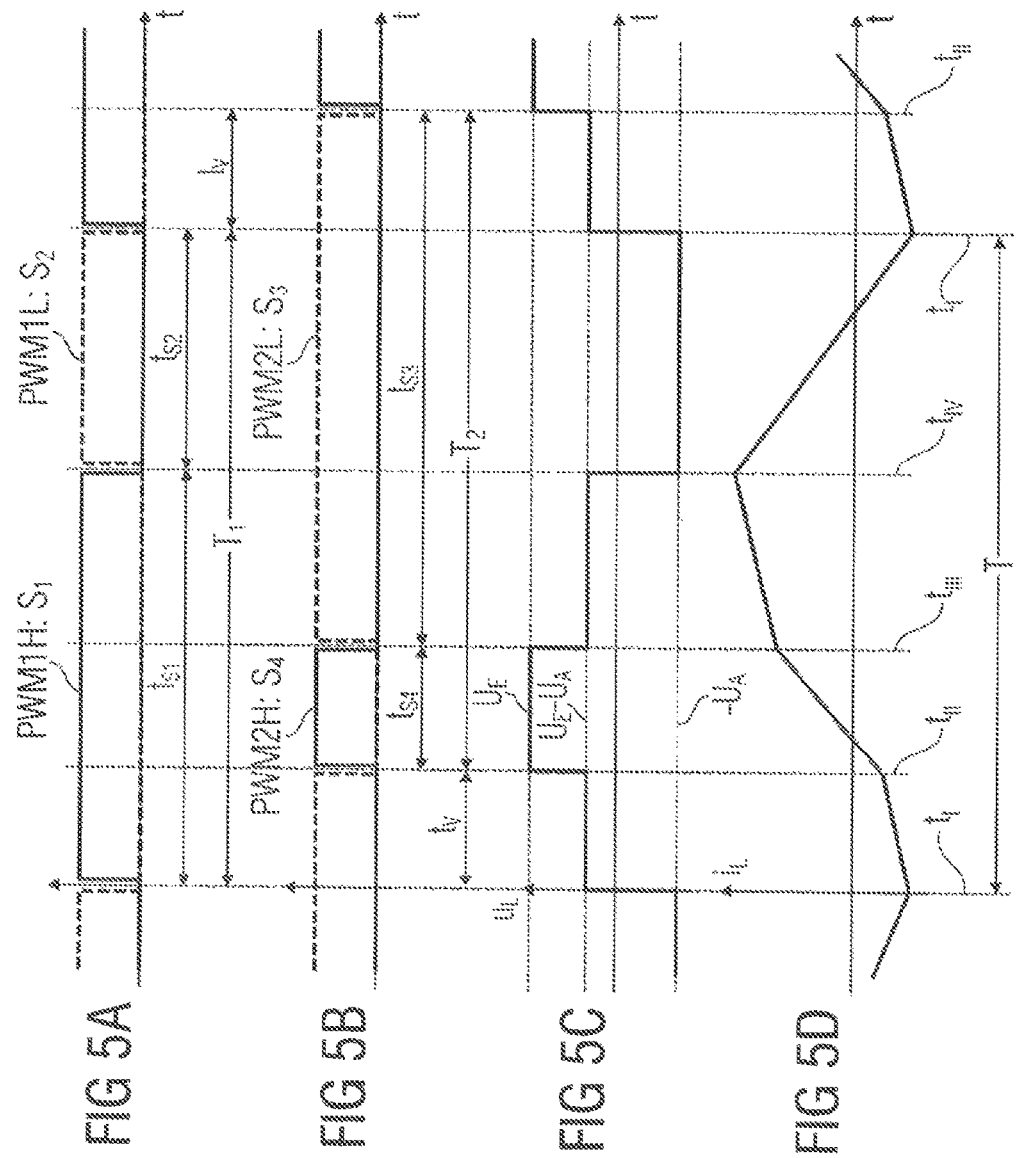

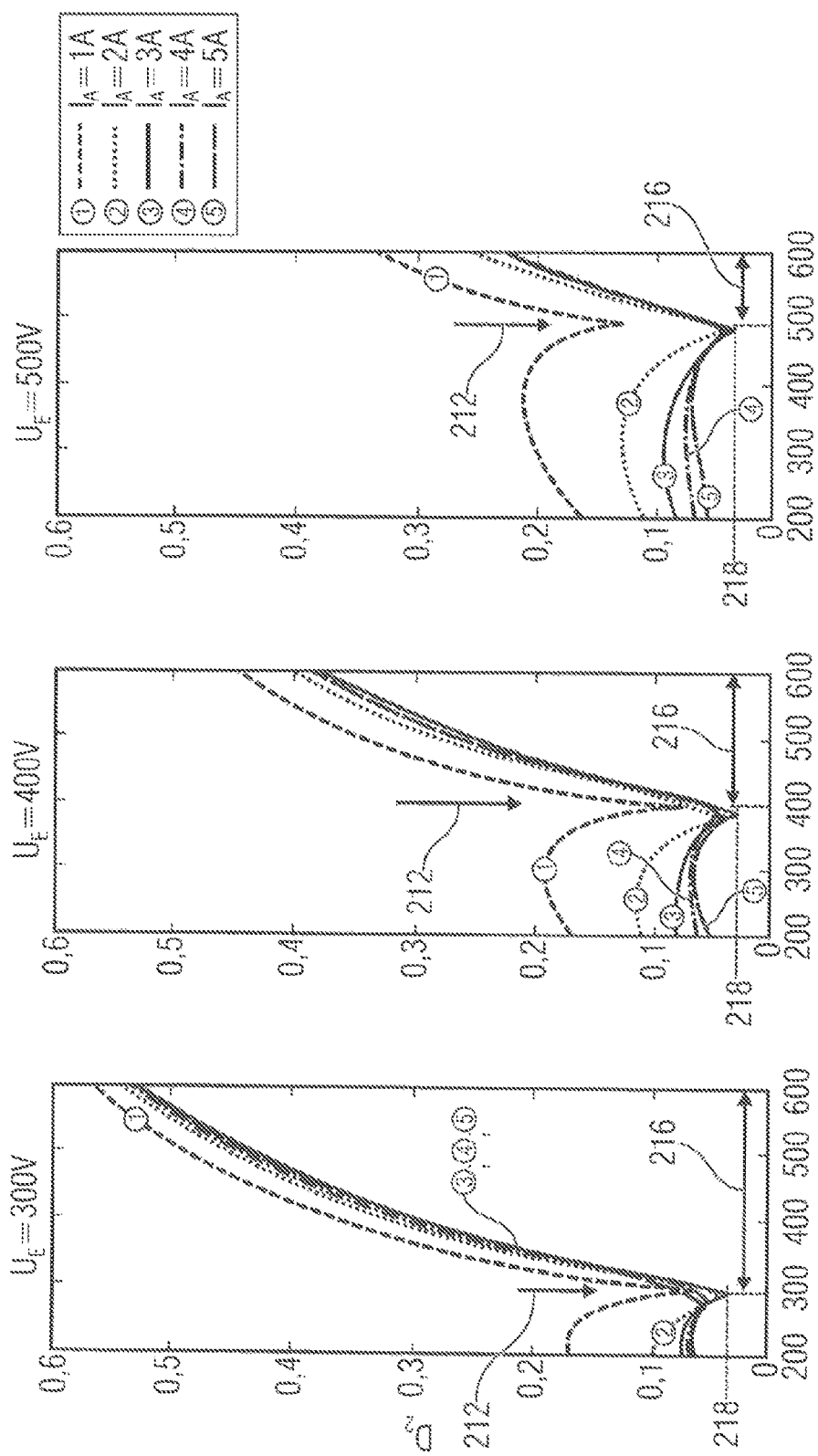

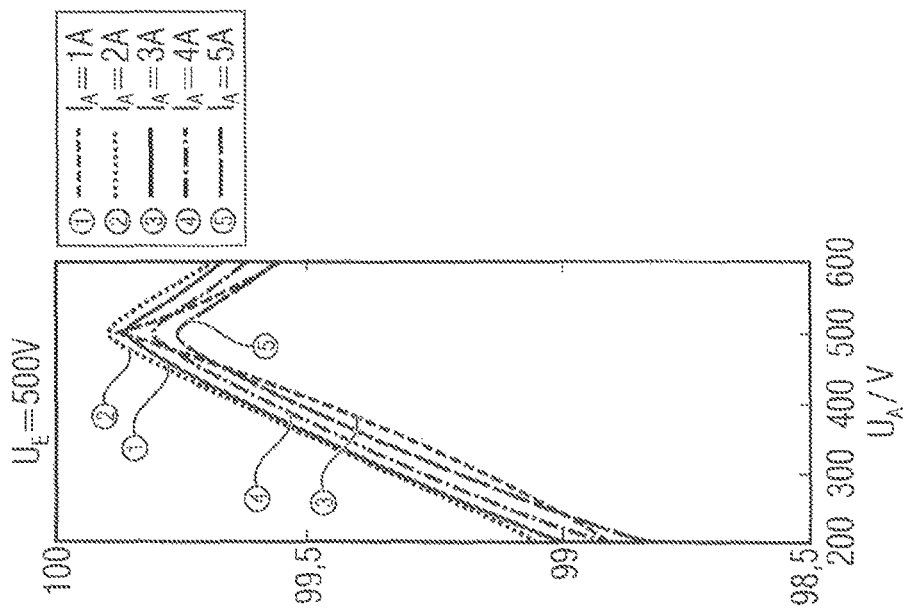
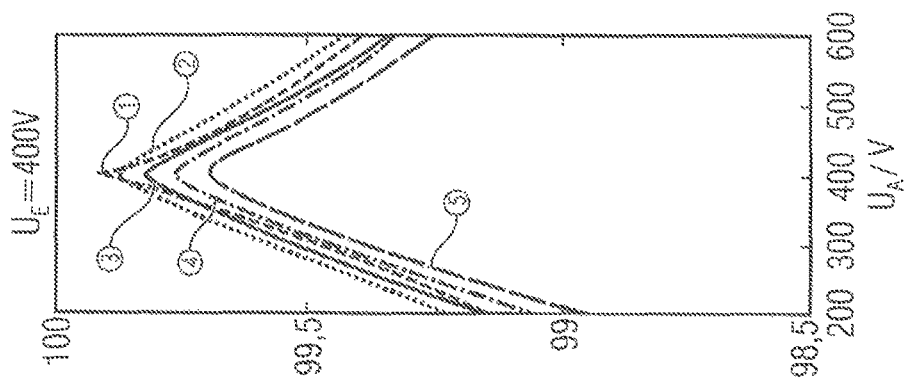
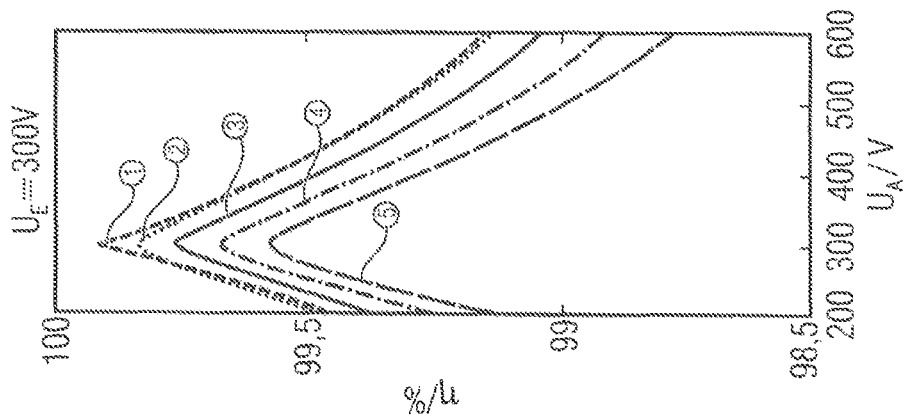
FIG 12C
FIG 12B
FIG 12A

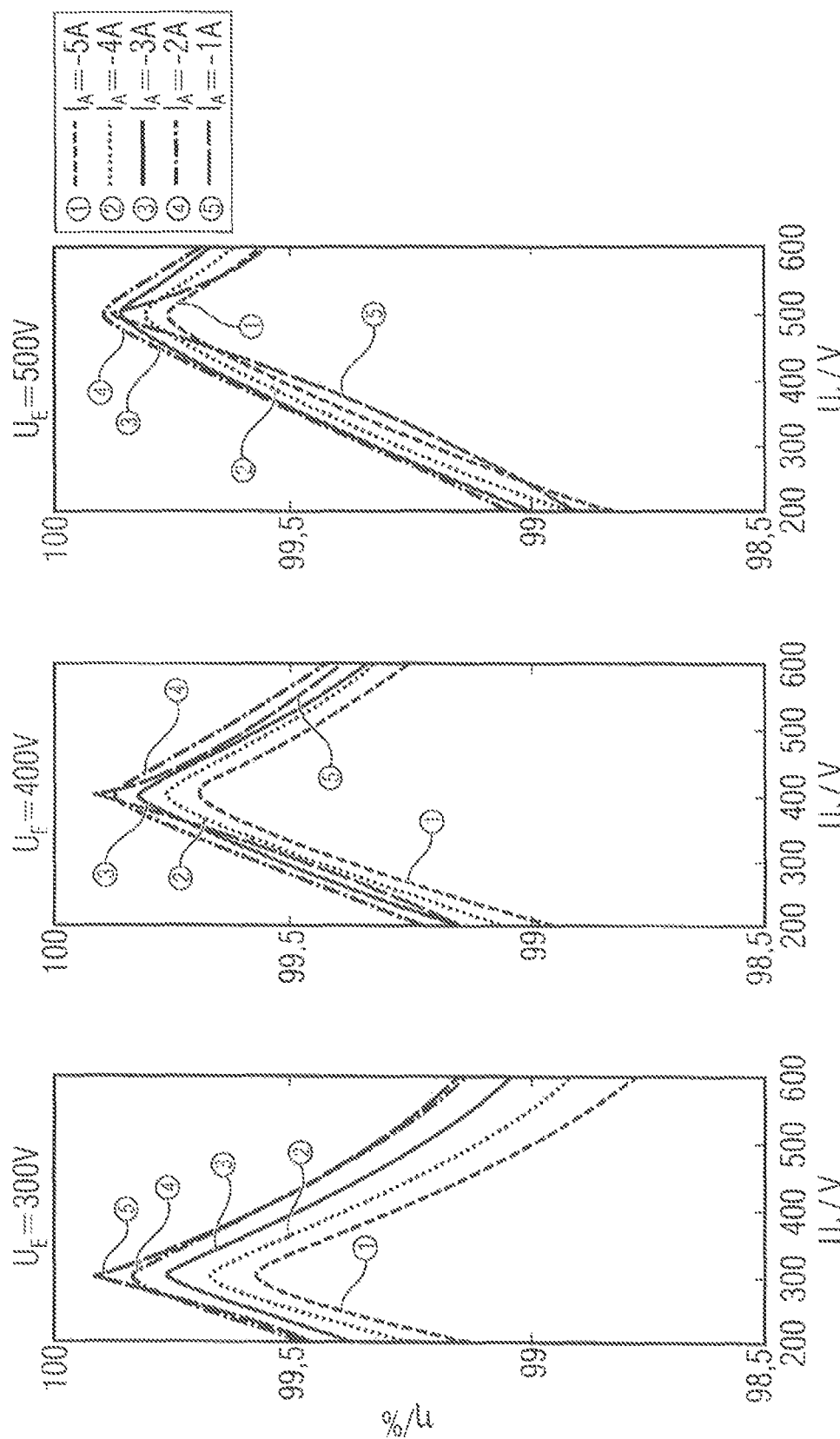

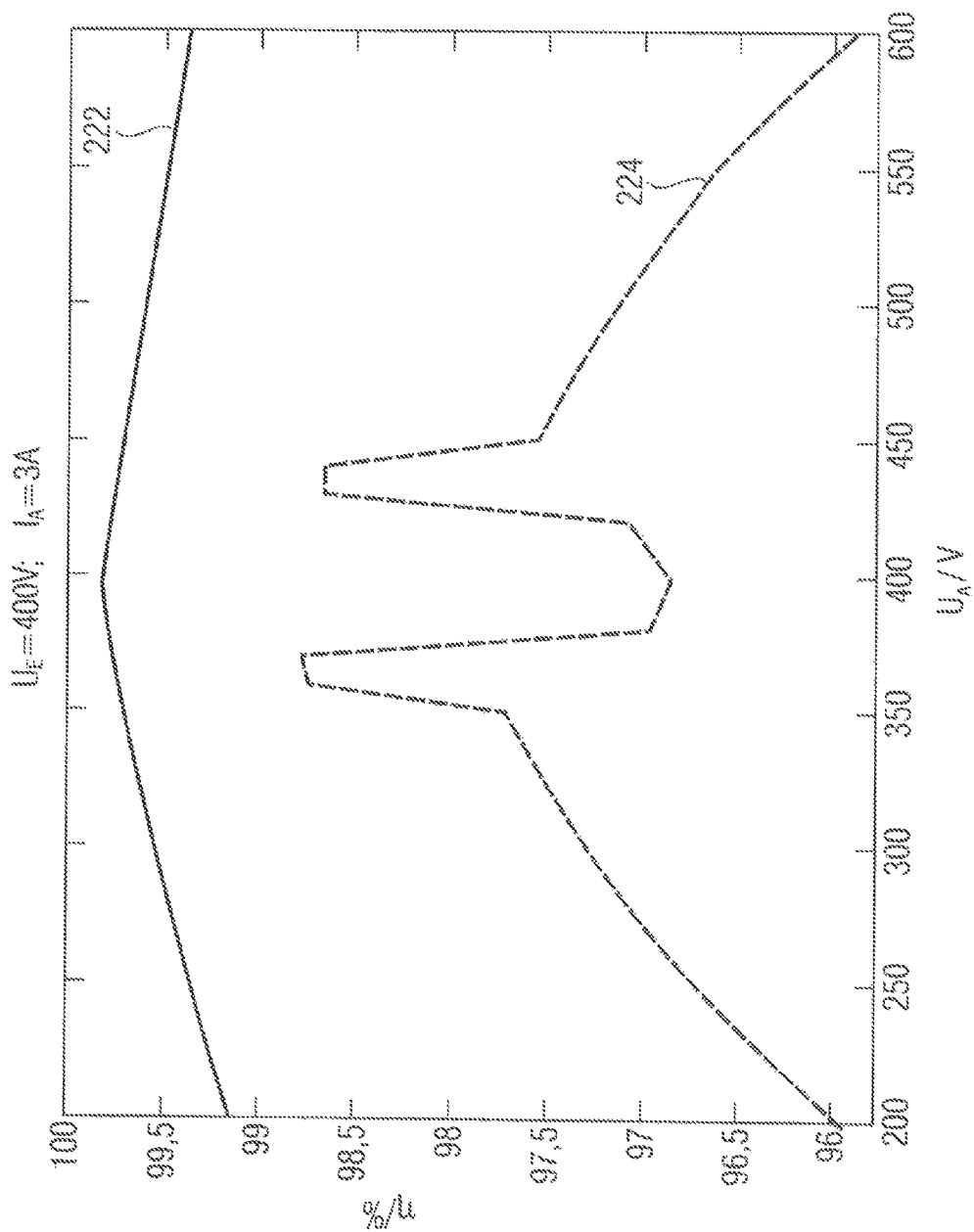

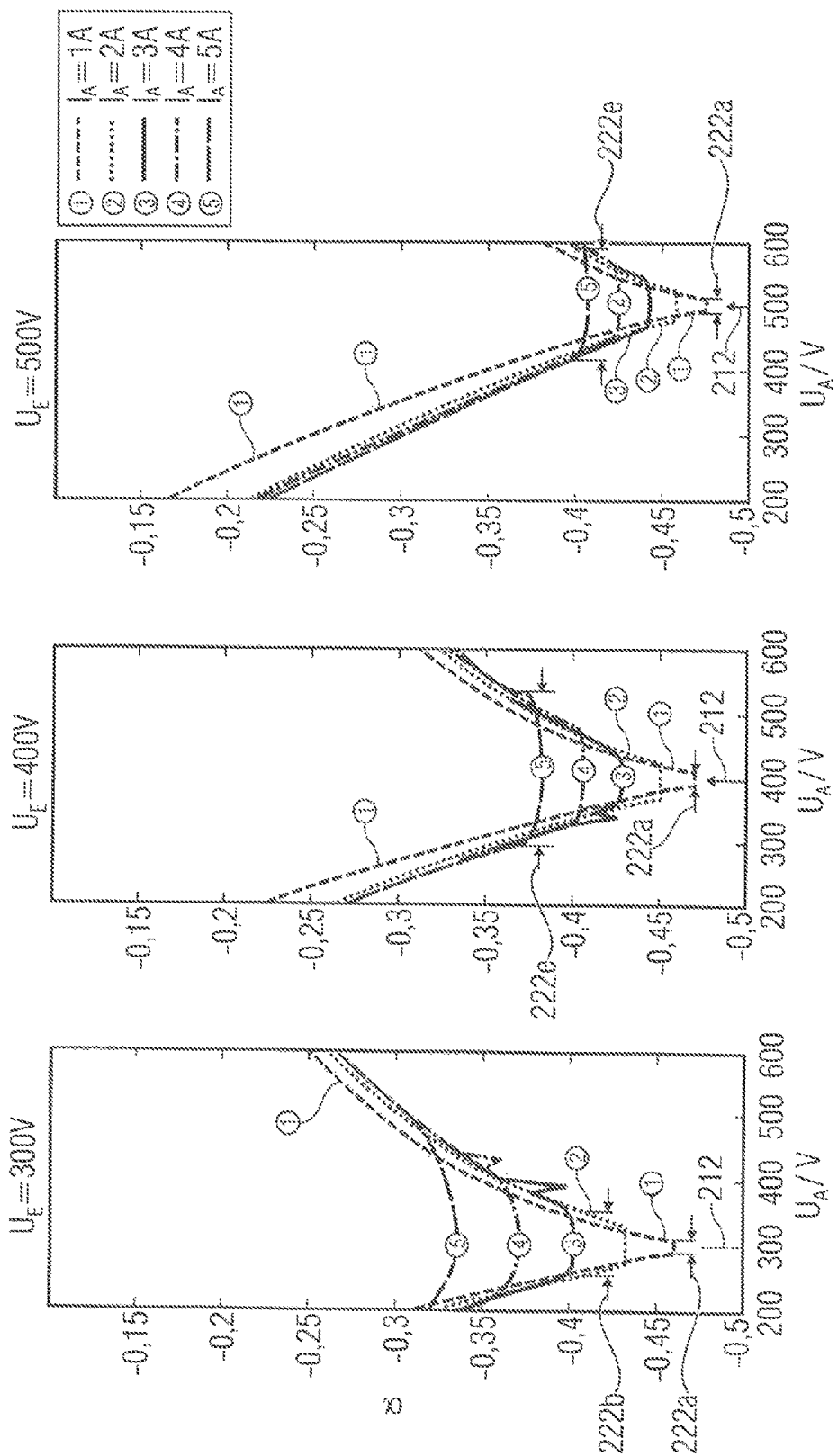

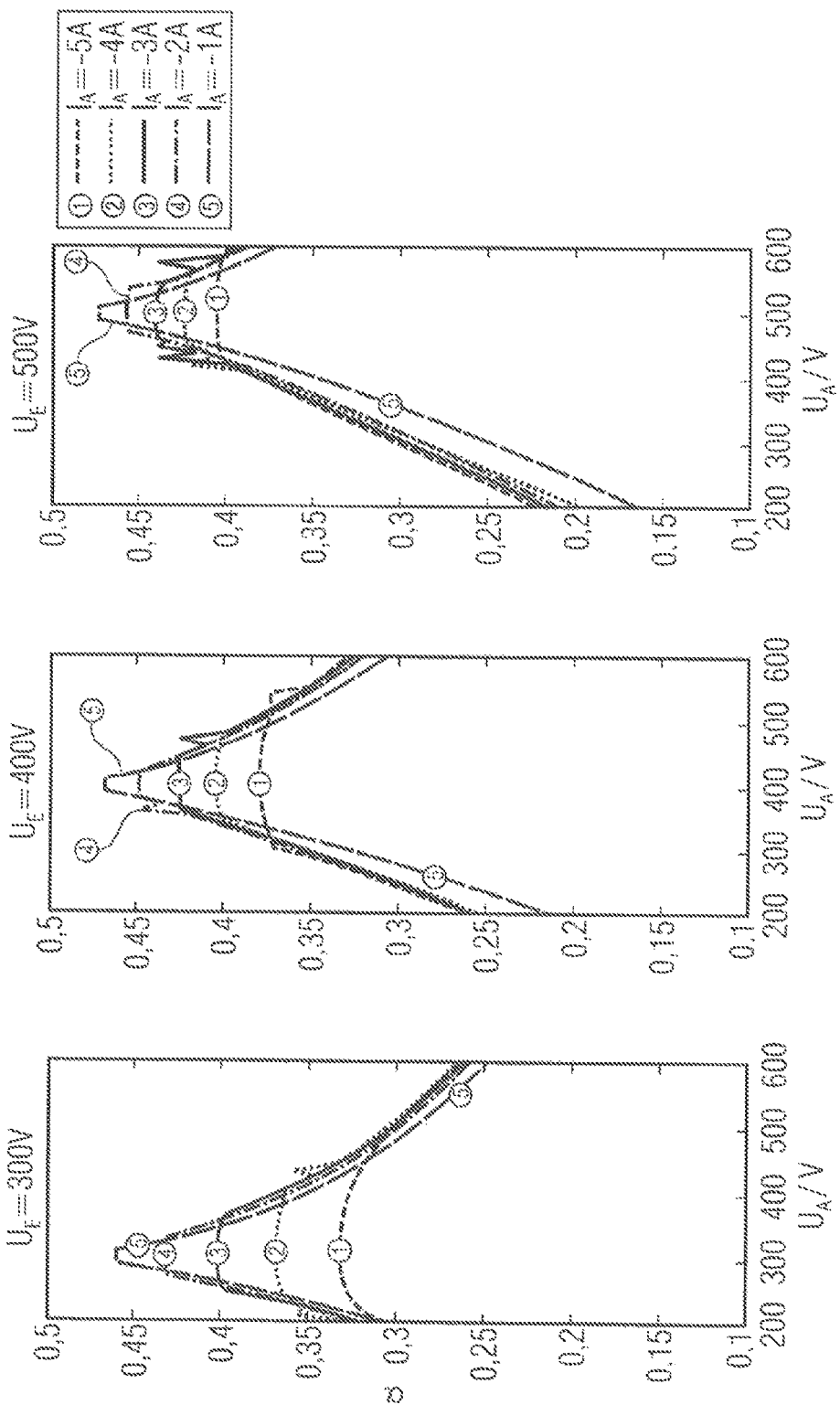

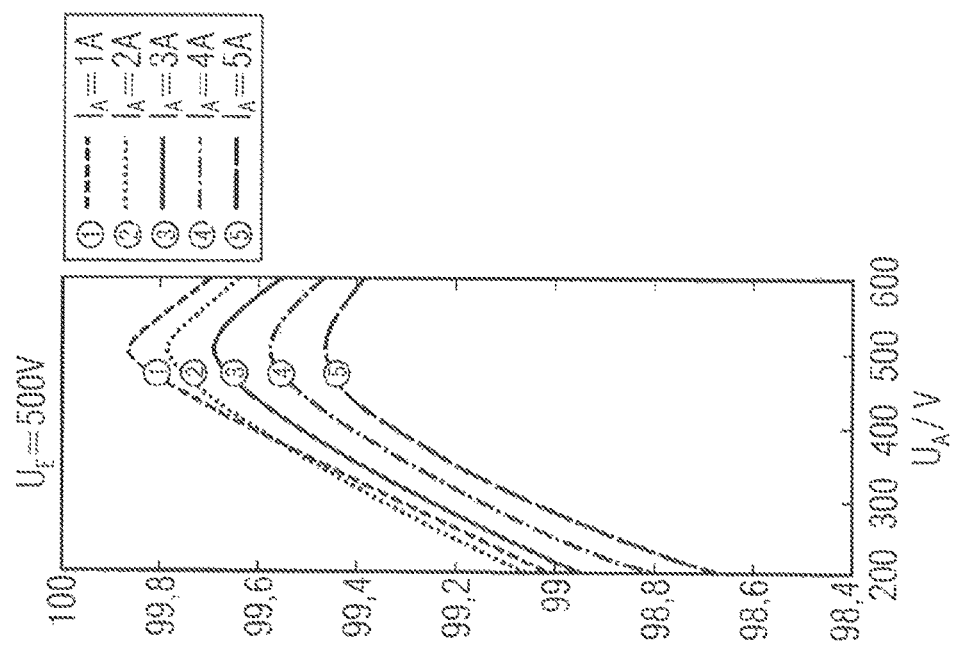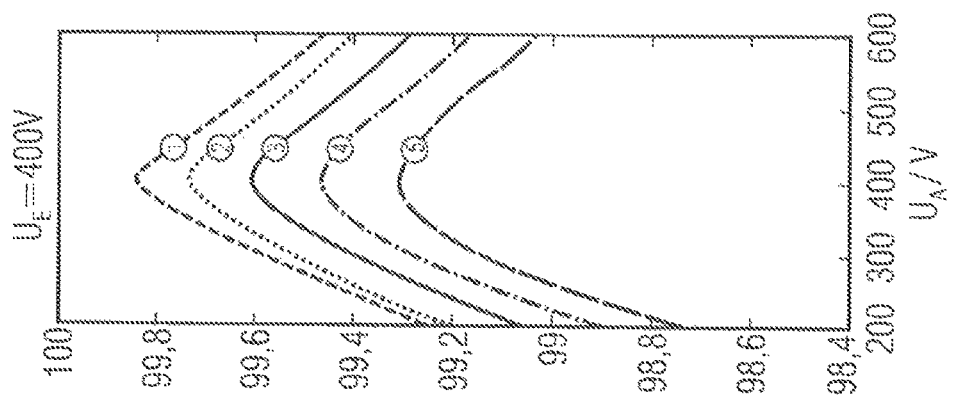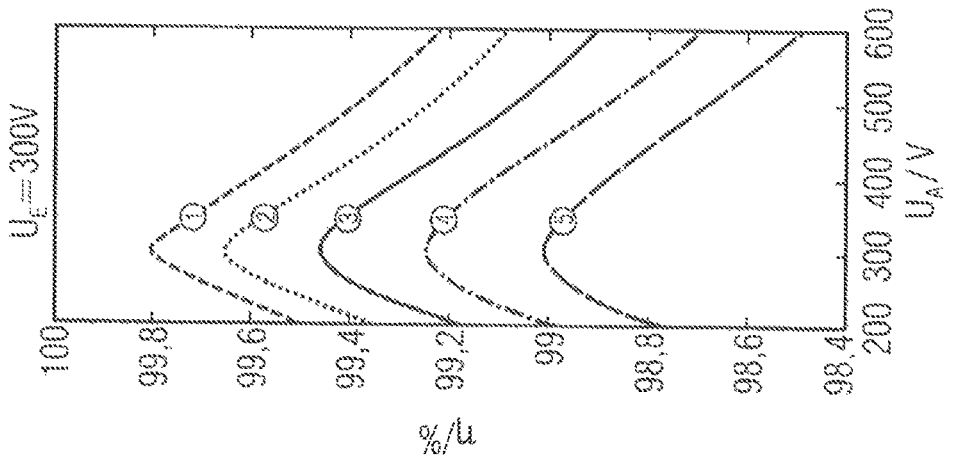

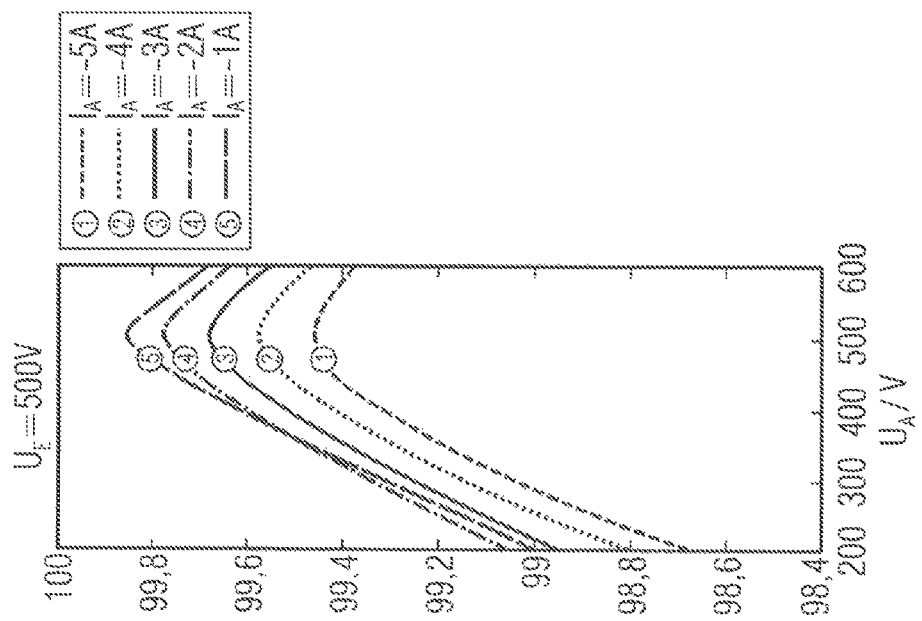
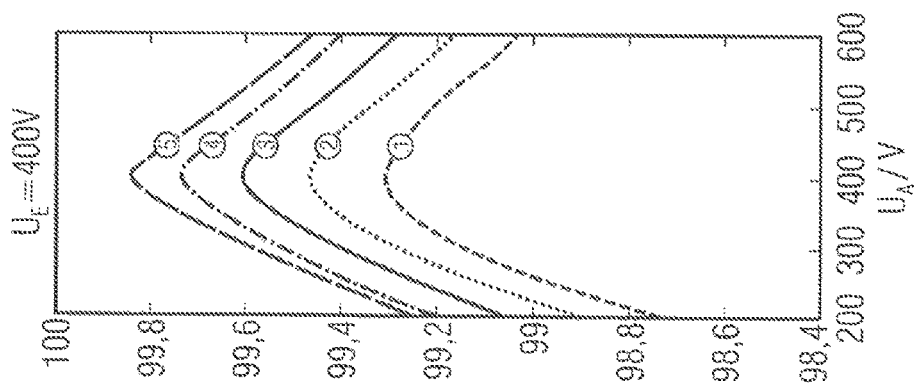
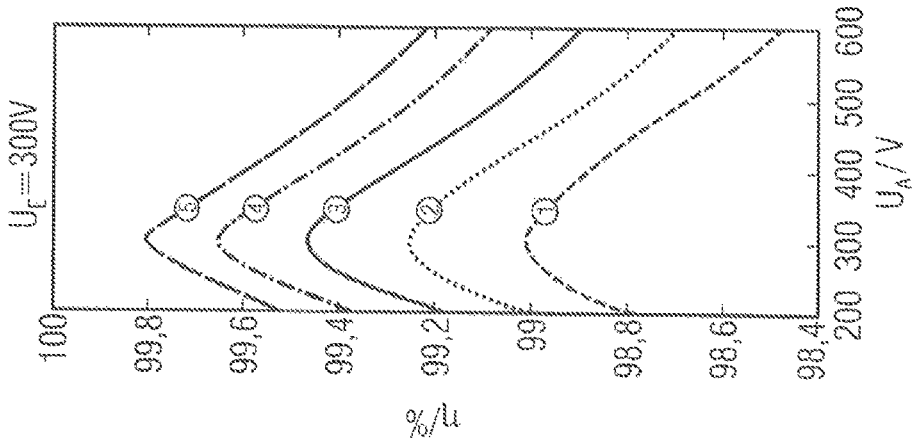

APPARATUS FOR CONTROLLING A SWITCHING DC-DC CONVERTER, SWITCHING DC-DC CONVERTER AND METHOD FOR CONTROLLING A SWITCHED DC-DC CONVERTER

CROSS-REFERENCE TO RELATED APPLICATIONS

This application is a continuation of copending International Application No. PCT/EP2016/074494, filed Oct. 12, 2016, which is incorporated herein by reference in its entirety, and additionally claims priority from German Application No. 10 2015 219 850.2, filed Oct. 13, 2015, which is also incorporated herein by reference in its entirety.

The present invention relates to an apparatus for controlling a switching DC-DC converter, in particular for controlling a buck-boost converter, to a switching DC-DC converter and to a method for controlling a switched DC-DC converter. Further, the present invention relates to a bidirectional cascaded buck-boost converter and concepts for configuring and controlling the buck-boost converters.

BACKGROUND OF THE INVENTION

For obtaining stable and highly efficient energy supply, nowadays, many regenerative energy systems are configured by a bidirectional DC-DC converter with temporary energy storage elements. Due to the energy recovery, the proportion of bidirectional bridge circuits increases continuously. The same have the function of adapting different voltage levels. Accordingly, it can happen in many applications that the areas of input and output voltage of the converter overlap in a charging and discharging energy storage. Consequently, a specific type of DC-DC converters is needed, which can be operated both in the buck mode, i.e. reduction of an input voltage as well as in the boost mode, i.e. increase of an input voltage.

There are cascaded buck-boost converters having four switches that are frequently used for such applications due to simple topology and high load capability. As an interface, in particular between regenerative energy systems and energy storages, the efficiency of the converter has a significant influence on the efficiency of the entire system.

U.S. Pat. No. 6,166,527 presents a control concept for a buck-boost converter for reducing power losses. Depending on the ratio of input and output voltage, the converter is operated in three different modes, in the buck mode, the boost mode or in the buck-boost mode. Thereby, the power losses of the DC-DC converter are reduced in buck and boost modes, but due to the simultaneous operation of the four switches, the losses in the buck-boost mode still remain high.

US 2012/0146594 A1 presents a control concept where the buck-boost converter is operated in five different modes. These are the buck mode, a buck mode with half the switching frequency, the buck-boost mode with half the switching frequency, the boost mode with half the switching frequency and the boost mode. When the input and output voltage approach one another, the switching frequency of the PWM signals (PWM=Pulse Width Modulation) is halved. Thereby, the range of the buck and boost modes can be extended and the range of the lossy buck-boost modes can be reduced accordingly. This enables an increase of the efficiency of the converter in the transition phase between the buck mode and the boost mode but has little energy efficiency in the buck-boost mode.

Therefore, there is a need for concepts of reducing or minimizing the power losses in cascaded buck-boost converters.

SUMMARY

According to an embodiment, an apparatus for controlling a switching DC-DC converter with a first half-bridge circuit including a first switch and a second switch, with a second half-bridge circuit including a third switch and a fourth switch and an inductance connected between the center taps of the first and the second half-bridge circuit, may have: a control unit that is configured to adapt, in dependence on an input voltage and an output voltage at the switching DC-DC converter, a switching frequency of switches of the DC-DC converter, a first and a second duty cycle of the first and fourth switch and the time delay between switching on the first and fourth switch; wherein the control unit is further configured to determine the switching frequency, the first duty cycle, the second duty cycle and the time delay based on an output current of the switching DC-DC converter; wherein the control unit for adapting the first duty cycle is further configured to increase, starting from a first situation where the output voltage is lower than the input voltage, the first duty cycle at an increasing output voltage up to a maximum value when in a second situation the output voltage corresponds to the input voltage, and to decrease, starting from the second situation, the first duty cycle to a lesser extent at an increasing output voltage than at a decreasing output voltage; wherein the control unit for adapting the second duty cycle is further configured to decrease, starting from a third situation where the output voltage is greater than the input voltage, the second duty cycle at a decreasing output voltage up to a minimum value when in a second situation the output voltage corresponds to the input voltage; and to increase, starting from the second situation, the second duty cycle to a lesser extent at a decreasing output voltage than at an increasing output voltage; wherein the control unit for adapting the switching frequency is further configured to increase, starting from a second situation where the output voltage corresponds to the input voltage, the switching frequency at a decreasing or increasing output voltage until the output voltage has reached a reference value and to reduce the switching frequency when the output voltage has exceeded the reference value; wherein the control unit for adapting the time delay is further configured to determine the time delay in a range between 0 and a time difference between a first time period where the first switch is switched on within a period duration and a second time period where the fourth switch $S_4$ is switched on within the period duration, in dependence on an output current of the switching DC-DC converter; and to increase the time delay at a negative output current of the switching DC-DC converter when the amount of the output current increases and to reduce the time delay at a positive output current of the switching DC-DC converter when the amount of the output current increases or wherein the time delay can be represented as $t_v = \alpha T$, wherein $t_v$ is the time delay, $\alpha$ a time delay factor and T a period duration of a switching cycle of the switches of the switching DC-DC converter, and wherein the control unit is configured to reduce an amount value of the time delay factor $\alpha$ at an increasing or decreasing output voltage, starting from a range of the output voltage that includes a second situation where the output voltage corresponds to the input voltage; to determine the amount value of the time delay factor in a range between 0 and 1, and to switch on the first switch at a positive output current of the switching DC-DC converter while the fourth switch is switched on and to reduce an amount of the time delay when the amount of the output current increases and wherein the control unit is configured to switch on the fourth switch at a negative output current of the switching DC-DC converter while the first switch is switched on and to increase the amount of the time delay when the amount of the output current increases.

According to another embodiment, a switching DC-DC converter may have: a first half-bridge circuit including a first switch and a second switch, a second half-bridge circuit including a third switch and a fourth switch, an inductance that is connected between the center taps of the first and the second half-bridge circuit; and a driving unit that is configured to adapt, in dependence on an input voltage and an output voltage at the switching DC-DC converter, a switching frequency of the switches of the DC-DC converter, the duty cycles of the first and fourth switch and the time delay between switching on of the first and fourth switch; wherein the driving unit is further configured to determine the switching frequency, the first duty cycle, the second duty cycle and the time delay based on an output current of the switching DC-DC converter; wherein the driving unit for adapting the first duty cycle is further configured to increase, starting from a first situation where the output voltage is lower than the input voltage, the first duty cycle at an increasing output voltage up to a maximum value when in a second situation the output voltage corresponds to the input voltage, and to decrease, starting from the second situation, the first duty cycle to a lesser extent at an increasing output voltage than at a decreasing output voltage; wherein the driving unit for adapting the second duty cycle is further configured to decrease, starting from a third situation where the output voltage is greater than the input voltage, the second duty cycle at a decreasing output voltage up to a minimum value when in a second situation the output voltage corresponds to the input voltage; and to increase, starting from the second situation, the second duty cycle to a lesser extent at a decreasing output voltage than at an increasing output voltage; wherein the driving unit for adapting the switching frequency is further configured to increase, starting from a second situation where the output voltage corresponds to the input voltage, the switching frequency at a decreasing or increasing output voltage until the output voltage has reached a reference value and to reduce the switching frequency when the output voltage has exceeded the reference value; wherein the driving unit for adapting the time delay is further configured to determine the time delay in a range between 0 and a time difference between a first time period where the first switch is switched on within a period duration and a second time period where the fourth switch is switched on within the period duration, in dependence on an output current of the switching DC-DC converter; and to increase the time delay at a negative output current of the switching DC-DC converter when the amount of the output current increases and to reduce the time delay at a positive output current of the switching DC-DC converter when the amount of the output current increases or wherein the time delay can be represented as $t_v=\alpha T$, wherein $t_v$ is the time delay, $\alpha$ a time delay factor and T a period duration of a switching cycle of the switches of the switching DC-DC converter, and wherein the driving unit is configured to reduce an amount value of the time delay factor a at an increasing or decreasing output voltage, starting from a range of the output voltage that includes a second situation where the output voltage corresponds to the input voltage; to determine the amount value of the time delay factor in a range between 0 and 1, and to switch on the first switch at a positive output current of the switching DC-DC converter while the fourth switch is switched on and to reduce an amount of the time delay when the amount of the output current increases and wherein the driving unit is configured to switch on the fourth switch at a negative output current of the switching DC-DC converter while the first switch is switched on and to increase the amount of the time delay when the amount of the output current increases.

According to another embodiment, a method for controlling a switched DC-DC converter may have the steps of: connecting a control unit and a switching DC-DC converter with a first half-bridge circuit including a first switch and a second switch, with a second half-bridge circuit including a third switch and a fourth switch, and an inductance that is connected between the center taps of the first and the second half-bridge circuit; adapting a switching frequency of the switches of the DC-DC converter, the duty cycles of the first and fourth switch and the time delay between switching on the first and fourth switch in dependence on an input voltage and an output voltage at the switching DC-DC converter; wherein adapting the switching frequency, the first duty cycle, the second duty cycle and the time delay is performed based on an output current of the switching DC-DC converter; for adapting the first duty cycle, increasing, starting from a first situation where the output voltage is lower than the input voltage, increasing the first duty cycle at an increasing output voltage up to a maximum value when in a second situation the output voltage corresponds to the input voltage, and decreasing, starting from the second situation, the first duty cycle to a lesser extent at an increasing output voltage than at a decreasing output voltage; for adapting the second duty cycle, decreasing, starting from a third situation where the output voltage is greater than the input voltage, the second duty cycle at a decreasing output voltage up to a minimum value when in a second situation the output voltage corresponds to the input voltage; and increasing, starting from the second situation, the second duty cycle to a lesser extent at a decreasing output voltage than at an increasing output voltage; for adapting the switching frequency, increasing, starting from the second situation where the output voltage corresponds to the input voltage, the switching frequency at a decreasing or increasing output voltage until the output voltage has reached a reference value and decreasing the switching frequency when the output voltage has exceeded the reference value; for adapting the time delay, determining the time delay in a range between 0 and a time difference between a first time period where the first switch is switched on within a period duration and a second time period where the fourth switch is switched on within the period duration in dependence on an output current of the switching DC-DC converter; and increasing the time delay at a negative output current of the switching DC-DC converter when the amount of the output current increases and reducing the time delay at a positive output current of the switching DC-DC converter when the amount of the output current increases or wherein the time delay can be represented as $t_v=\alpha T$, wherein $t_v$ is the time delay, $\alpha$ a time delay factor and T a period duration of a switching cycle of the switches of the switching DC-DC converter, and wherein for adapting the time delay, an amount value of the time delay factor is reduced at an increasing or decreasing output voltage, starting from a range of the output voltage that includes a second situation where the output voltage corresponds to the input voltage; determining the amount value of the time delay factor in a range between 0 and 1; and switching on the first switch at a positive output current of the switching DC-DC converter while the fourth switch is switched on and reducing an amount of the time delay when the amount of the output current increases and switching on the fourth switch while the first switch is switched on and increasing the amount of the time delay when the amount of the output current increases.

A core idea of the present invention is the finding that switching losses in cascaded buck-boost converters can be reduced or minimized in that switches of the DC-DC converters are switched in a voltage-free manner, such as according to a ZVS concept (ZVS=Zero Voltage Switching). This enables the replacement of hard-switching operations, i.e. switching operations where voltages are applied to the power terminals of the switches with the help of soft-switching operations, i.e. at least approximately zero-voltage or zero-current switching operations. This is obtained by control concepts for switching DC-DC converters according to embodiments.

A DC-DC converter comprises, for example, a first half-bridge circuit including a first switch and a second switch and a second half-bridge circuit including a third switch and a fourth switch. The switching DC-DC converter includes an inductance connected between the center taps of the first and second half-bridge circuits. According to an embodiment, an apparatus for controlling a switching DC-DC converter includes a control unit that is configured to adapt, in dependence on an input voltage and an output voltage at the switching DC-DC converter, a switching frequency of the switches of the DC-DC converter, the duty cycles of the first and fourth switches and the time delay between switching on the first switch and switching on the fourth switch. The control unit is configured to determine the switching frequency, the first duty cycle, the second duty cycle and the time delay based on an output current of the switching DC-DC converter. By adapting the switching frequency, the duty cycles and the time delay, high-efficiency operation of the buck-boost converter is enabled across a large range of operating points and at all allowed performance points and operating points, respectively.

According to a further embodiment, a switching DC-DC converter includes a half-bridge circuit including a first switch and a second switch and a second half-bridge circuit including a third switch and a fourth switch. The switching DC-DC converter includes an inductance that is connected between the center taps of the first and the second half-bridge circuits. Further, the switching DC-DC converter includes a driving unit that is configured to adapt, in dependence on an input voltage and an output voltage at the switching DC-DC converter, a switching frequency of the switches of the DC-DC converter, the duty cycles of the first and fourth switches and the time delay between switching on the first switch and the fourth switch. The driving unit is configured to determine the switching frequency, the first duty cycle, the second duty cycle and the time delay based on an output current of the switching DC-DC converter.

According to a further embodiment, a method for controlling a switched DC-DC converter includes connecting a control unit to a switching DC-DC converter. The switching DC-DC converter comprises a first half-bridge circuit including a first switch and a second switch and a second half-bridge circuit including a third switch and a fourth switch. The switching DC-DC converter includes an inductance connected between the center taps of the first and second half-bridge circuits. The method includes adapting a switching frequency of the switches of the DC-DC converter, the duty cycles of the first and fourth switch and the time delay between switching on the first and the fourth switch in dependence on an input voltage and an output voltage at the switching DC-DC converter. Adapting the switching frequency, the first duty cycle, the second duty cycle and the time delay is performed based on an output current of the switching DC-DC converter.

BRIEF DESCRIPTION OF THE DRAWINGS

Embodiments of the present invention will be detailed subsequently referring to the appended drawings, in which:

FIG. 3a-3f show schematically a time course of driving the switches according to a first concept of embodiments described herein;

FIG. 5a-5d show a time course of driving the switches according to the first concept where dead times of the switches are neglected;

FIG. 9a-9c show schematic curves of a second duty cycle adjusted by the control unit according to the first concept of embodiments described herein;

FIG. 12a-12c show schematic curves of efficiencies of the first concept of embodiments described herein with positive output currents;

FIG. 13a-13c show schematic curves of efficiencies of the first concept of embodiments described herein with negative output currents;

FIG. 14 shows a comparison of efficiencies between the first concept of embodiments described herein for switching a DC-DC converter and a concept according to conventional technology;

FIG. 17a-17c show schematic curves of a time delay factor at different ratios between an output voltage and an input voltage with positive output currents according to the second concept of embodiments described herein;

FIG. 18a-18c show curves of the time delay factor for negative values of the output current comparable to FIGS. 17a to 17c according to the second concept of embodiments described herein;

FIG. 19a-19c show schematically an obtainable efficiency for the second concept of embodiments described herein for a positive output current; and FIG. 20a-20c show a representation of efficiencies comparable to FIG. 19a to 19c according to the second concept of embodiments described herein for negative output currents.

DETAILED DESCRIPTION OF THE INVENTION

Before embodiments of the present invention will be discussed in more detail below based on the drawings, it should be noted that identical, functionally equal or equal elements, objects and/or structures are provided with the same reference numbers in the different figures such that the description of these elements illustrated in different embodiments is mutually exchangeable and inter-applicable, respectively.

The following embodiments use indices for distinguishing the same or similar elements in the figures, such as switches or capacitances. The description refers to these indices individually or by using the general index i. The usage of the index i is to be understood such that the same refers to all or each individual one of the respective elements.

Figure 1:
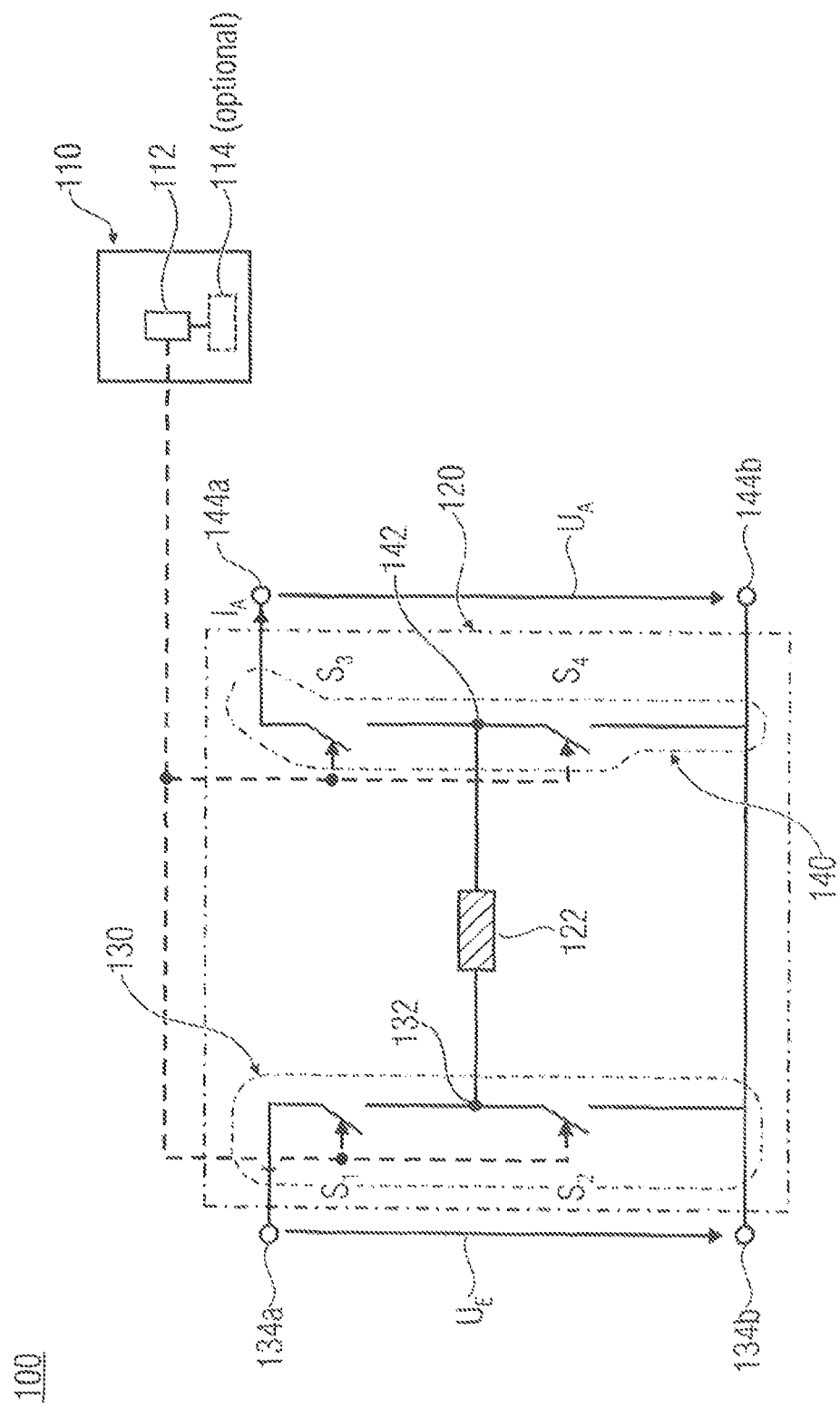
FIG. 1 is a schematic block diagram of an apparatus for controlling a switching DC-DC converter according to an embodiment.

FIG. 1 shows a schematic block diagram of an apparatus 110 for controlling a switching DC-DC converter 120. The switching DC-DC converter 120 includes a first half-bridge circuit 130 and a second half-bridge circuit 140. The first half-bridge circuit 130 includes a first switch $S_1$ and a second switch $S_2$ that are connected, for example in a series connection. The first half-bridge circuit 130 includes a center tap 132 that is arranged between the switches $S_1$ and $S_2$. The second half-bridge circuit 140 includes two switches $S_3$ and $S_4$ that are also serially connected. A center tap 142 of the second half-bridge circuit 140 is arranged between switches $S_3$ and $S_4$. An inductance 122 is connected between center taps 132 and 142, such that the half-bridge circuits 130 and 140 are connected via the inductance 122. Gates of the half-bridge circuits 130 and 140, respectively, can include terminals 134a, 134b and 144 and 144b, respectively. Terminals 134b and 144b can also each be connected to one another, such that a common reference potential of the half-bridge circuits 130 and 140 is obtained. The block diagram of the switching DC-DC converter can be considered as simplified block diagram of a cascaded buck-boost converter.

The apparatus 110 includes a control unit 112 that is configured to adapt, in dependence on an input voltage $U_E$ between terminals 134a and 134b and depending on an output voltage $U_A$ between terminals 144a and 144b, a switching frequency of switches $S_1$ to $S_4$, duty cycles of at least the first switch $S_1$ and the fourth switch $S_4$, and the time delay between switch-on operations of the switches $S_1$ and $S_4$, which will be discussed in detail below. By these adaptations, switching losses can be low such that high efficiency of the operation of the switching DC-DC converter 120 is obtained.

According to a further embodiment, a switching DC-DC converter 100 includes the switching DC-DC converter 120, i.e. the first half-bridge circuit 130, the second half-bridge circuit 140 and the inductance 122. The switching DC-DC converter 100 includes the control unit 112 as driving unit. This means the switching DC-DC converter 100 can include the buck-boost converter as well as a driving unit for adapting the switching frequency of the switches, the duty cycles as well as for adapting the time delay.

The control unit can be configured, for example, as processor, microcontroller, programmable logic device (for example a field programmable gate array, FPGA) or the same. The apparatus 110 can, for example, comprise a storage 140 where values for the switching frequency, the duty cycles and/or the time delay are stored. The stored values can have a relation to the input voltage $U_E$, to the output voltage $U_A$ and/or a relation to an output current $I_A$, such that the stored values can be determined based on the reference value. In that way, due to sensor values and/or due to received signals, the driving unit can comprise information with respect to the input voltage, the output voltage and possibly the output current and can read out parameters to be adjusted from the storage based thereon. Alternatively, the apparatus 110 can be configured to determine the respective values, for example based on a calculation rule implemented by an apparatus 110 or stored in the storage 114. The following embodiments are described such that the control unit is configured to determine the switching frequency, the duty cycles and the time delay based on the input voltage, the output voltage and based on the output current of the switching DC-DC converter. According to further embodiments, the DC-DC converter is configured to determine the switching frequency, the duty cycles and the time delay based on the input voltage and the output voltage of the switching DC-DC converter. The switching DC-DC converter can have an essentially constant output current, such that considering the output current can be omitted. In that way, for example, a current choke can be used to obtain a constant current flow.

Figure 2:
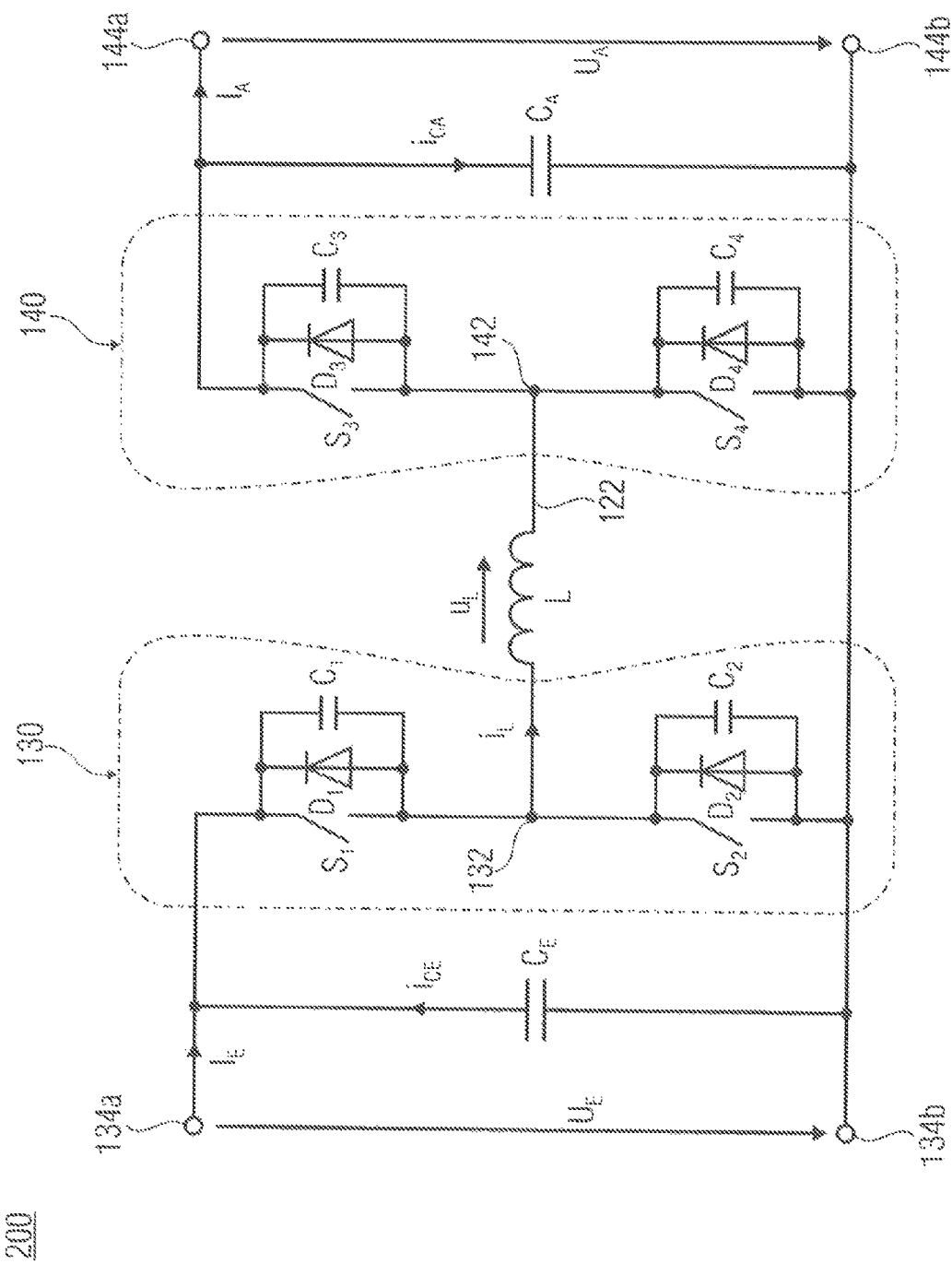
FIG. 2 is a schematic block diagram of a switching DC-DC converter as it can be driven by the driving unit according to FIG. 1.

FIG. 2 shows a schematic block diagram of a switching DC-DC converter 200 as it can be driven by the driving unit 112. One diode $D_1$, $D_2$, $D_3$ and $D_4$, respectively, and one capacitance $C_1$, $C_2$, $C_3$ and $C_4$, respectively is connected in parallel to switches $S_1$ to $S_4$. Capacitances $C_E$ and $C_A$, respectively, can be connected between terminals 134a and 134b and 144a and 144b, respectively. Switches $S_1$ to $S_4$ can be configured as semiconductor-based switches and in particular as so-called "power semiconductors", such as in the form of MOSFETs (MOSFET=Metal Oxide Semiconductor Field Effect Transistor) or IGBTs (IGBT=Insulated Gate Bipolar Transistor).

The diodes $D_1$ to $D_4$ can be realized, for example, as parasitic diodes of switches $S_1$ to $S_4$. Alternatively or additionally, these can be diodes integrated in the switches $S_1$ to $S_4$. Alternatively or additionally, diodes $D_1$ to $D_4$ can be discrete diodes additionally connected in parallel to switches $S_1$ to $S_4$. The capacitances $C_1$ to $C_4$ can be realized as parasitic capacitances of switches $S_1$ to $S_4$. Alternatively or additionally, capacitances $C_1$ to $C_4$ can be connected in parallel to switches $S_1$ to $S_4$ as discrete capacitances.

The inductance 122 indicated by L can be used as storage choke, i.e. as electronic power inductance. A current $i_L$ through the inductance 122 is shown such that the same flows from the first half-bridge circuit 130 to the second half-bridge circuit 140. Here, the current $i_L$ can assume both positive and negative values, i.e. effective current flow is possible in both directions. Via the inductance 122, a voltage $U_L$ drops during operation. An input current $I_E$ is shown such that a current flow of a positive current $I_E$ is characterized by the direction of the arrow, i.e. starting from the terminal 134a toward the switch $S_1$. Simply put, when $I_E$ is positive, $I_E$ flows from left to right, wherein this is mutually exchangeable when the current $I_E$ is negative. $U_A$ refers to the output voltage, while $I_A$ refers to the output current. A flow direction of a positive current $I_A$ is indicated by the direction of the arrow, i.e. when the current $I_A$ is positive, the current $I_A$ flows towards the terminal 144a, i.e. from left to right, wherein this is mutually exchangeable when $I_A$ is negative. The directions of the arrows of currents $i_{CE}$ through the input capacitor $C_A$ and $i_{CA}$ through the output capacitor $C_A$ also refer to the respective positive flow direction.

FIGS. 3a to 3f show schematically a time course of driving the switches $S_1$ to $S_4$ according to a first concept of embodiments described herein. FIGS. 3a to 3f have a common time axis t. The time instants $t_1$ to $t_{14}$ as well as $t_1'$ to $t_{14}'$ indicated in FIG. 3f relate to a driving interval $T_1$ of the first half-bridge circuit 130 and also indicate time instants in the other FIGS. 3a to 3e. Time instants $t_1'$ to $t_{14}'$ indicate time instants in previous or subsequent driving intervals comparable to time instants $t_1$ to $t_{14}$.

FIG. 3a shows a schematic curve of driving the switch $S_1$ that can be driven with the signal PWM1H and the switch $S_2$ that can be driven with a signal PWM1L. FIG. 3b shows a schematic curve of driving the switch $S_3$ that can be driven with a signal PWM2L and the switch $S_4$ that can be driven with a signal PWM2H. The signals for driving switches $S_1$ and $S_4$ are, for example pulse-width modulated signals (PWM signals). Switches $S_1$ and $S_2$ and/or $S_3$ and $S_4$, respectively can be controlled in pairs such that the same are each essentially controlled complementarily to one another. For example, at the most one of switches $S_1$ or $S_2$ and $S_3$ or $S_4$, respectively, is switched on. FIG. 3a and FIG. 3b are illustrated in a simplified manner such that the same have a low level L (low) and a high level H (high). A low level indicates a switched-off state of the respective switch. Each of the switches $S_1$ to $S_4$ can be implemented according to a normally on or normally off configuration, simply as put as NO contact or as NC contact. The high level H indicates a switched-on, i.e. conductive state of a switch configured as No contact. The switched-off state relates to a non-conductive state. When implementing a switch $S_1$ to $S_4$ as NC contact, a similar behavior can be obtained by inverting the respective signal.

Switches $S_1$ and $S_2$ are controlled within the switching period $T_1$. Switches $S_3$ and $S_4$ are controlled within the switching period $T_2$. The switching period $T_2$ is shifted by the time delay $t_v$ with respect to the switching period $T_1$ and has an essentially equal period duration T. The switching frequency f by which switches $S_1$ to $S_4$ are switched is, for example 1/T. The control unit 112 is configured to change the time duration T and hence the frequency f=1/T. Further, the control unit is configured to change time durations $t_{S1}$ to $t_{S4}$ describing a respective time duration or time interval within which the respective switches $S_1$ to $S_4$ are switched on. The time durations $t_{S1}$ to $t_{S4}$ are also referred to as switch-on times. A dead time $t_{dead1}$ to $t_{dead4}$ can be arranged between the switched-on states of two switches $S_1$ and $S_2$ and $S_3$ and $S_4$, respectively, of a half-bridge circuit, where both switches of the half-bridge circuit are switched off respectively. Changing the switch-on times $t_{S1}$ to $t_{S4}$ can be considered as change of a duty cycle of the respective switch, i.e. as portion within the period duration T where the respective switch is switched on.

Compared to the switch $S_1$, the switch $S_4$ is switched on after the time delay $t_v$. The time delay $t_v$ can be considered as portion of the period duration T and is also variably adjustable by the control unit 112.

The driving concepts presented herein have the common idea of modulating the switching frequency 1/T, the duty cycles $t_{si}$/T of the driving signals and the time delay $t_v$ between the driving signals for the first half-bridge circuit (left side of the buck-boost converter with switches $S_1$ and $S_2$) and the driving signals for the second half-bridge circuit (right side of the buck-boost converter with switches $S_3$ and $S_4$) in dependence on operating points of the switched DC-DC converter. Here, an operating point refers to an applied input voltage and an applied output voltage. The operating point can be dependent on or can be influenced by the output current $I_A$. By the modulations, on the one hand, the operation of the power semiconductors (switches) enhanced by ZVS can be ensured. On the other hand, the further losses, including the forward losses in the switches, the losses in the storage choke as well as the losses in the input and output capacitors can be minimized.

As illustrated in FIG. 3a, the time duration of the high-level state H of the signal PWM1H within a period T has the value $t_{s1}$i. This means the time duration of the switch on state of the switch $S_1$ within a period is $t_{s1}$. The time duration of the high level state of the signal PWM1L within a period is $t_{s2}$. This means the time duration of the switch on state of $S_2$ within a period is $t_{s2}$. The dead time between switching off the switch $S_1$ and switching on the switch $S_2$ is indicated by $t_{dead1}$.

As illustrated in FIG. 3b, the signals PWM2H and PWM2L have the period $T_2$ which has the same period duration T as the period duration $T_1$ of the signals PWM1H and PWM1L. The time duration of the high level state H of the signal PWM2H within a period is indicated by $t_{s4}$. This means the time duration of the switch-on state of the switch $S_4$ within the period T is $t_{s4}$. The time duration of the high-level state of the signal PWM2L within the period T is indicated by $t_{s3}$. This means the time duration of the switch-on state of the switch $S_3$ within the period T is $t_{s3}$. The dead time between switching off the switch $S_4$ and switching on the switch $S_2$ is indicated by $t_{dead4}$.

According to an embodiment, the time duration $t_{s1}$ is longer than the time duration $t_{s4}$, such that $t_{s1} > t_{s4}$ applies. The time delay $t_v$ between switching on the switch $S_1$ and the switch $S_4$ has a time duration of 0 and is at the same time smaller than or equal to the difference of time durations $t_{s1}$ and $t_{s4}$, such that the following applies: $0 \le t_v \le t_{s1} - t_{s4}$. According to this embodiment, the control unit is configured to control the switches of the switching DC-DC converter such that the second switch $S_2$ is switched off when the fourth switch $S_4$ is switched on. This means that a switch state of the switch $S_3$ and a switch state of the fourth switch $S_4$ are essentially complementary to one another in each operating point of the switched DC-DC converter, when, for example, the dead times are neglected. In other words, according to this embodiment, switches $S_3$ and $S_4$ are never on at the same time. Alternatively or additionally, the control unit can be configured to switch on the fourth switch only in time intervals where the first switch $S_1$ is switched on. This can be used for controlling a commutation of currents in the switching DC-DC converter for obtaining load-free ZVS states of the switches even for varying operating points. According to an embodiment, the control unit is configured to control switching operations of switches $S_4$ only at time instants when the switch S1 is in the switched-on state.

As indicated in FIGS. 3a and 3b, the time durations $t_{s1}$ to $t_{s4}$ can have differing time durations. According to embodiments as discussed below, the time durations can also be the same or pairs thereof can be the same.

An order of the switching operations of the switches according to FIGS. 3a to 3f can also be described such that starting from a situation after the time instant $t_1$ where switch $S_1$ is switched on, switch $S_3$ is switched off at time instant $t_2$. At a following time instant $t_4$, switch $S_4$ is switched on. At a subsequent time instant $t_6$, switch $S_4$ is switched off. At a subsequent time instant $t_8$, switch $S_3$ is switched on. At a subsequent time instant $t_9$, switch $S_1$ is switched off. Thereupon, at a time instant $t_{11}$, switch $S_2$ is switched on in order to be switched off at a subsequent time instant $t_{12}$. At a subsequent time instant $t_1'$ indicting, for example, a start of a new period T of the first half-bridge circuit, switch $S_1$ is switched on again.

The above inequation regarding the time delay $t_v$ has two limiting cases. A first limiting case is given for $t_v=0$. In that case, an order of the switching operations of the switches can be described such that switches $S_1$ and $S_4$ are switched on simultaneously, switch $S_4$ is switched off and after that switch $S_3$ is switched on. Subsequently, switch $S_1$ is switched off. Then, switch $S_2$ is switched on, whereupon switches $S_2$ and $S_3$ are switched off simultaneously. At a following time instant, switches $S_1$ and $S_4$ are again switched on simultaneously, i.e. with little or no delay. For the second limiting case, when $t_v=t_{S1}-t_{S4}$, the order of switches can be summarized such that switch $S_1$ is switched on first and at a later time switch $S_3$ is switched off. At a following time instant, switch $S_4$ is switched on. At a subsequent time instant, switches $S_1$ and $S_4$ are switched off simultaneously. At a later time instant, switches $S_2$ and $S_3$ are switched on simultaneously. At a subsequent time instant, switch $S_2$ is switched off. At a later time instant, switch $S_1$ is switched on.

FIGS. 3c and 3d show the curves of the voltage $U_L$ and the current $I_L$ of the storage choke L, cf. FIG. 2, within one period. During switching on switches $S_1$ and $S_3$, the voltage $U_L$ is equal to the difference between the input voltage $U_E$ and the output voltage $U_A$, i.e. $u_L = U_E - U_A$. The current $I_L$ is negative and changes with the slope $(U_E - U_A)/L$. During switching on switches $S_1$ and $S_4$, the voltage $U_L$ is equal to the input voltage $U_E$. The current $I_L$ increases with the slope $U_E/L$ and changes its direction from negative to positive. During switching on switches $S_2$ and $S_3$, the negative voltage $-U_A$ is applied to the storage choke. The current $i_L$ and its current strength, respectively, decreases and changes from positive to negative. The current $i_L$ of the storage choke changes its direction twice within a period, i.e. the same has a sign change twice per period. When switching off switches $S_1$ and $S_4$, the storage choke current $i_L$ is, for example, positive. When switching off switches $S_2$ and $S_3$, the current $i_L$ is negative.

In FIG. 3e, voltages $u_{DS1}$ and $u_{DS2}$ are each illustrated on switches $S_1$ and $S_2$. Switches $S_1$ and $S_2$ can be controlled such that the same are switched in a voltage-free manner, this means switching enhanced by ZVS (ZVS=Zero Voltage Switching) can be performed. In that way, the voltage $u_{DS2}$ is, for example 0 at the time instant $t_{11}$ when switch $S_2$ is switched on. At the time instant $t_1$ when switch $S_1$ is switched on, the voltage $u_{DS1}$ is equal to 0 or approximately 0. At the time instant $t_8$ when switch $S_3$ is switched on, the voltage $u_{DS3}$ is equal to 0 or approximately 0. At the time instant $t_4$ when switch $S_4$ is switched on, the voltage $u_{DS4}$ is, for example, equal to 0 or approximately 0.

FIGS. 4a to 4l show schematically states of the current flow during the switching periods described in FIGS. 3a to 3f.

At the time instant $t_9$, switch $S_1$ is switched off in a voltage-free manner. Due to the voltage $u_{DS}$ that has not been dissipated, the diode $D_2$ is still off at the time $t_9$. Consequently, the positive current $i_L$ can possibly exclusively commute to capacitances $C_1$ and $C_2$. Thereby, capacitance $C_1$ is charged and capacitance $C_2$ is discharged. At the time instant $t_{10}$, the voltage $u_{DS}$ of switch $S_2$ is dissipated to 0. The current $i_L$ flows through the diode $D_2$. At the time instant $t_{11}$, switch $S_2$ is switched on in a voltage-free manner. The current $i_L$ commutes from the diode to the channel of switch $S_2$ as illustrated, for example, in FIGS. 4g, 4h and 4i. This commutation can be performed with little losses and approximately without any losses, respectively.

At the time instant $t_{13}$, switch $S_2$ is switched off in a voltage-free manner. Due to the voltage $u_{DS1}$ that is not dissipated, the diode $D_1$ is still off at the time instant $t_{13}$. Consequently, the negative current $i_L$ can possibly exclusively commute to capacitors $C_1$ and $C_2$. Thereby, capacitance $C_1$ is discharged and capacitance $C_2$ is charged. At the time instant $t_{14}$, the voltage $u_{DS1}$ of switch $S_1$ is dissipated and has, for example, a value of 0 or approximately 0. The current $i_L$ flows through the diode $D_1$. At the time instant $t_1'$ of the subsequent switching interval, switch $S_1$ is switched on in a voltage-free manner. The current $i_L$ commutes from the diode to the channel of switch $S_1$, as illustrated, for example in FIGS. 4j, 4k and 4l. This commutation can be performed with little losses and possibly approximately without any losses. In FIG. 3f, voltages $u_{DS3}$ and $u_{DS4}$ are each illustrated for switches $S_3$ and $S_4$. Switches $S_3$ and $S_4$ are also switched in a manner enhanced by ZVS and hence in a low-loss or lossless manner as described above for switches $S_1$ and $S_2$.

Figures 4A, 4B, 4C:
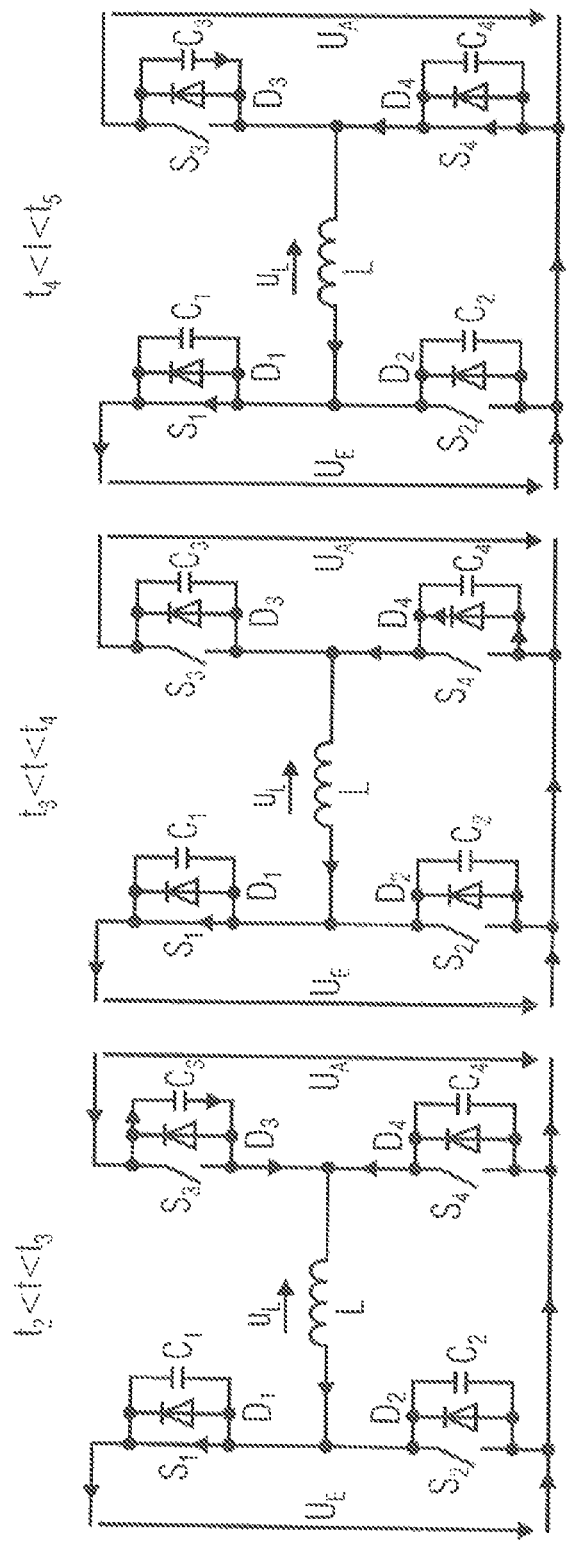
FIG. 4a-4l show schematically states of the current flow through the switching DC-DC converter based on the first concept.

At the time instant $t_2$, switch $S_3$ is switched off in a voltage-free manner. Due to the voltage $u_{DS4}$ that has not been dissipated, the diode $D_4$ is off at the time instant $t_2$. Consequently, the negative current $i_L$ can only commute to the capacitors $C_3$ and $C_4$. Thereby, capacitance $C_3$ is charged and capacitance $C_4$ is discharged. At the time instant $t_3$, the voltage $u_{DS4}$ of switch $S_4$ is reduced to 0. The current $i_L$ flows through the diode $D_4$. At the time instant $t_4$, switch $S_4$ is switched on in a voltage-free manner. Subsequently, the current commutes without losses or with little losses from the diode to the channel of switch $S_4$ as illustrated in FIGS. 4a, 4b and 4c.

Figure 4F:
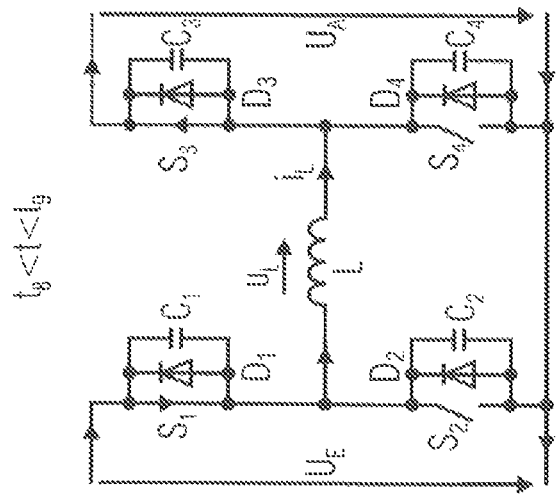
Figure 4E:
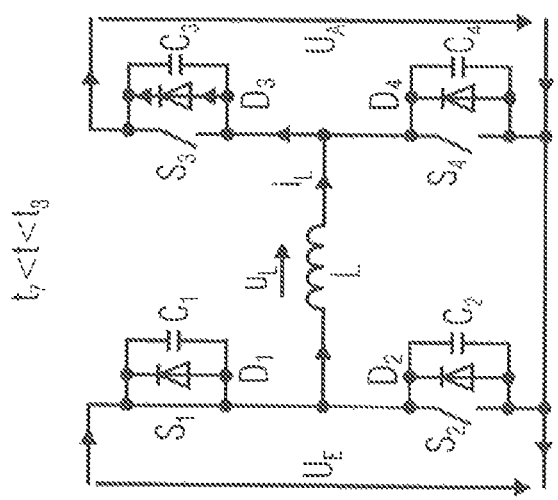
Figure 4D:
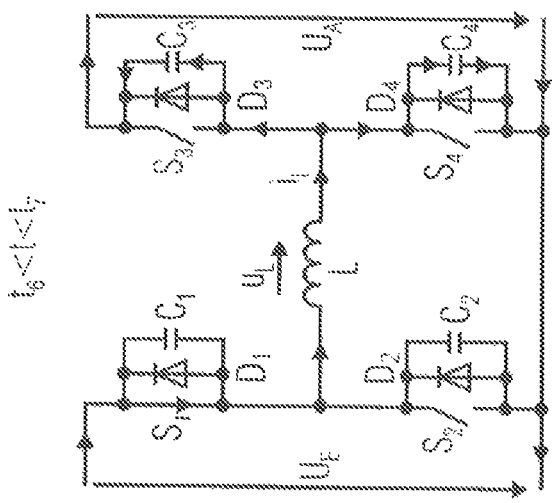
Figure 4I:
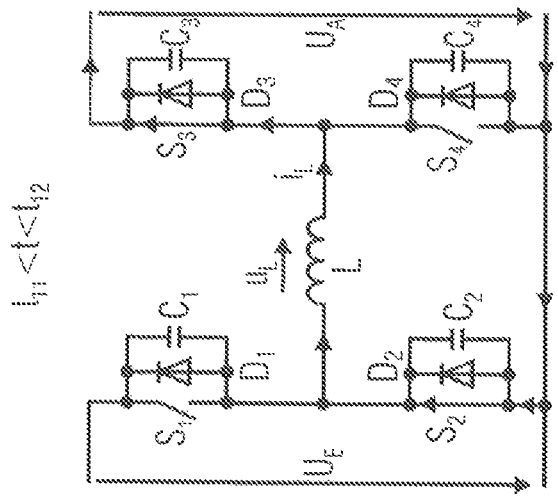
Figure 4H:
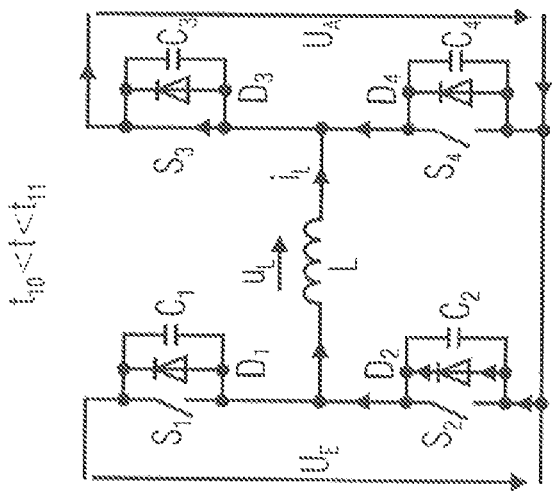
Figure 4G:
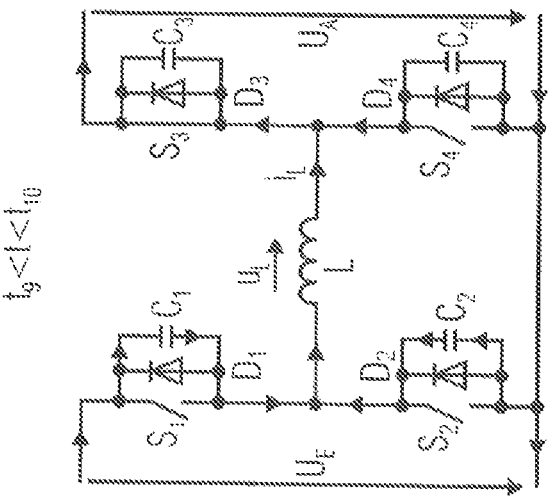
Figure 4J:
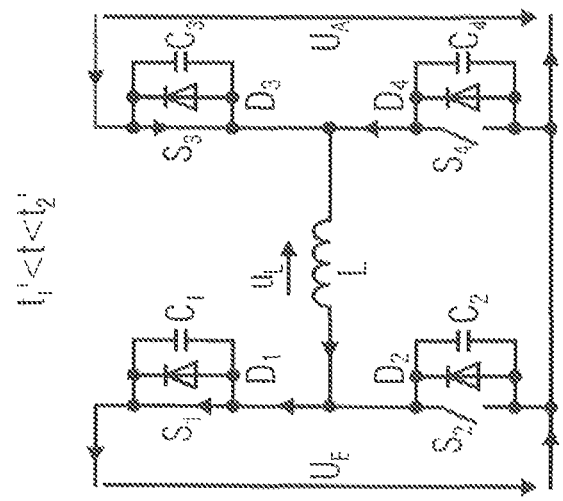
Figure 4K:
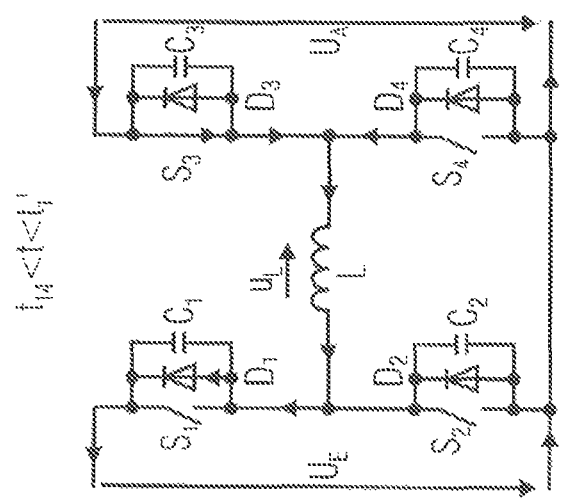
Figure 4L:
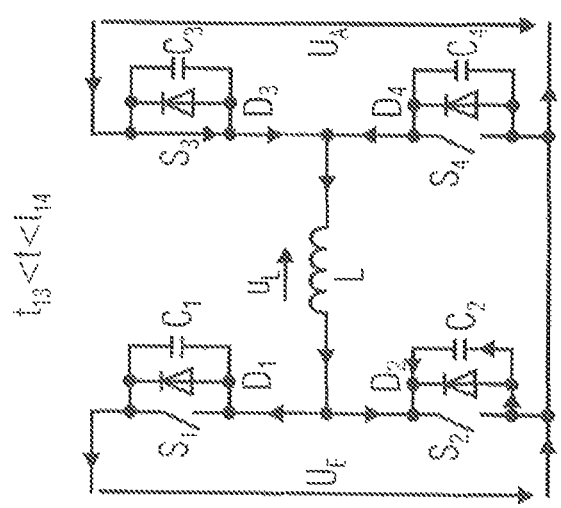

At the time instant $t_6$, switch $S_4$ is switched off in a voltage-free manner. Due to the voltage $u_{DS3}$ that has not been dissipated, the diode $D_3$ is off at the time instant $t_6$. Consequently, the positive current $i_L$ can only commute to capacitors $C_3$ and $C_4$. Thereby, capacitance $C_3$ is discharged and capacitance $C_4$ is charged. At the time instant $t_7$, the voltage $U_{DS3}$ of switch $S_3$ is reduced to zero. The current $i_L$ flows through the diode $D_3$. At the time instant $t_8$, switch $S_3$ is switched on in a voltage-free manner. The current commutes in a lossless manner or without losses from the diode to the channel of switch $S_3$ as illustrated in FIGS. 4d, 4e and 4f.

From FIGS. 3a to 3f, it becomes clear that changing the input voltage and/or the output voltage can effect a change of the time instants when the respective switches can be switched on or switched off in a voltage-free manner. The control unit 112 is configured to adapt the switching frequency of the switches, the duty cycles of switches and the time delay between switching on switch $S_1$ and switch $S_4$ in dependence on the input voltage and the output voltage at the switching DC-DC converter.

Before the adjustment of the switching frequency, the duty cycles and time delay will be discussed below, some background will be briefly discussed. As stated above, the dead times $t_{dead1}$, $t_{dead2}$, $t_{dead3}$ and $t_{dead4}$ can be very short and compared to the switch-on times, i.e., times where the respective switches are conductive, $t_{S1}$, $t_{S2}$, $t_{S3}$ and $t_{S4}$, the same can be neglected. This applies, for example, for low frequencies, such as frequencies of up to 150 kHz. At high frequency, such as above 1 GHz, the dead times $t_{dead1}$, $t_{dead2}$, $t_{dead3}$ and $t_{dead4}$ can include a relevant time portion. When neglecting the dead times $t_{dead1}$, $t_{dead2}$, $t_{dead3}$ and $t_{dead4}$, the following results approximately:

$$T = t_{S1} + t_{S2} = t_{S3} + t_{S4} \qquad (1)$$

The duty cycles $D_1$ of the first switch $S_1$ and $D_2$ of the switch $S_4$ can be defined as:

$$D_1 = \frac{t_{S1}}{T}, \quad D_2 = \frac{t_{S4}}{T} \qquad (2)$$

From this, it can be derived that $$\frac{U_A}{U_E} = \frac{D_1}{1-D_2} \qquad (3)$$

This means that the voltage transformation ratio of input voltage to output voltage $U_A$ can depend on the duty cycles $D_1$ and $D_2$, in particular switch-on times $t_{S1}$ and $t_{S}2$ as well as period T. The voltage transformation ratio can be independent of the time delay $t_v$ between switching on switches $S_1$ and $S_4$. By varying the duty cycles $D_1$ and $D_2$, the output voltage $U_A$ can be controlled and/or regulated. The transformation ratio can be derived as follows:

Generally, it can apply for the storage choke L that:

$$u_L = L \cdot \frac{di_L}{dt} \Rightarrow i_L(t) = i_L(t_1) + \frac{1}{L} \cdot \int_{t_1}^{t} u_L dt \qquad (4)$$

Since the current curve of the storage choke $i_L$ can repeat in stationary states of the switched DC-DC converter, it results, for example, that:

$$i_L(T+t_I) = i_L(t_I) \qquad (5)$$

By inserting equation 4 into equation 5, the following results:

$$\int_{t_I}^{t_1+T} u_L dt = 0 \qquad (6)$$

FIG. 5a to 5d correspond essentially to FIG. 3a to 3d, wherein the dead times are neglected. From FIG. 5c, the voltage levels of the voltage $u_L$ at the storage choke can be inferred at the individual time instants $t_1$ to $t_4$. The following applies:

$$t_I \rightarrow t_{II}: u_L = U_E - U_A$$

$$t_{II} \rightarrow t_{III}: u_L = U_E$$

$$t_{III} \rightarrow t_{IV}: u_L = U_E - U_A$$

$$t_{IV} \rightarrow t_I: u_L = -U_A \qquad (7)$$

By inserting equation 7 in equation 6, the following results:

$$\int_{t_1}^{t_1+T} u_L dt = \int_{t_I}^{t_{II}} u_L dt + \int_{t_{II}}^{t_{III}} u_L dt + \int_{t_{III}}^{t_{IV}} u_L dt + \int_{t_{IV}}^{t_I} u_L dt = 0 \qquad (8)$$

$$\Downarrow$$

$$(U_E - U_A) \cdot t_V + U_E \cdot t_{S4} +$$
$$(U_E - U_A) \cdot (t_{S1} - t_V - t_{S4}) + (-U_A) \cdot (T - t_{S1}) = 0$$

$$\Downarrow$$

$$\frac{U_A}{U_E} = \frac{t_{S1}}{T - t_{S4}} = \frac{D_1}{1 - D_2}$$

When switching off switches $S_2$ to $S_3$, the storage choke current $i_L$ is negative, cf. for example FIG. 3d at the time instants $t_{13}$ and $t_2$ or FIG. 5d at the time instant $t_1$. Negative current $i_L$ cannot guarantee that switches $S_2$ and $S_3$ are switched in a manner enhanced by ZVS and hence in a lossless manner. Additionally, for example, one requirement can be that the amount of the current $i_L$ is greater than a reference value $I_0$, so that the capacitors $C_2$ and $C_3$, respectively, that are connected in parallel to the switches can be completely recharged within the dead times. The reference value $I_0$ of the current will be discussed below in more detail.

This can apply similarly for the current $i_L$ for switches $S_1$ and $S_4$. At the time instants $t_9$ and $t_6$, the current is, for example, positive. Here, the requirement can also be that the amount of the current $i_L$ is greater than the value $I_0$ so that the capacitors $C_1$ and $C_4$, respectively, that are connected in parallel to the switches can be completely recharged during the dead times. If this is fulfilled the switches $S_1$ and $S_4$ can be switched in a lossless manner. Mathematically, the conditions for lossless switching of the switches can be illustrated as follows:

Condition 1:

$$\max(i_L(t_2), i_L(t_{13})) \leq -I_0$$

Condition 2:

$$\min(i_L(t_6), i_L(t_9)) \geq I_0 \qquad (9)$$

The control unit 112 can be configured to fulfil these conditions by varying the switching frequencies, the duty cycles and the time delay. The values of the current $i_L$ at the time instants $t_2$, $t_6$, $t_9$ and $t_{13}$ depend, for example, on operating points, the switching frequency $f=1/T$ and the switching period T and the time delay $t_v$. An operating point relates, for example, to the parameters input voltage $U_E$, the output voltage $U_A$ and the output current $I_A$. When the operating points change, such as when the output voltage $U_A$ decreases, the load current $I_A$ increases or the supply voltage $U_E$ varies and the switching frequency f and/or the time delay $t_v$ are not adapted, the values of the current $i_L$ change when switching off the switches at the time instants $t_2$, $t_6$, $t_9$ and $t_{13}$. This can have the effect that the above-stated conditions of equation 9 are violated. Adapting the switching frequency f, the time delay $t_v$ in dependence on the operating points allows prevention of violation of the conditions.

As stated above, the voltage transformation ratio is influenced by duty cycles $D_1$ and $D_2$. For a voltage transformation ratio $U_A/U_E$, several combinations of $D_1$ and $D_2$ can exist. For example, for a voltage transformation ratio $U_A/U_E=2$ the combination $D_1=0.7$ and $D_2=0.65$ or $D_1=0.8$ and $D_2=0.6$ or $D_1=0.9$ and $D_2=0.55$ can be suitable. The first duty cycle and the second duty cycle can be determined based on the voltage transformation ratio. When boosting the input voltage ($U_A > U_E$) and/or bucking the same ($U_A < U_E$), the first duty cycle can be greater than or equal to the second duty cycle.

Figure 6A:
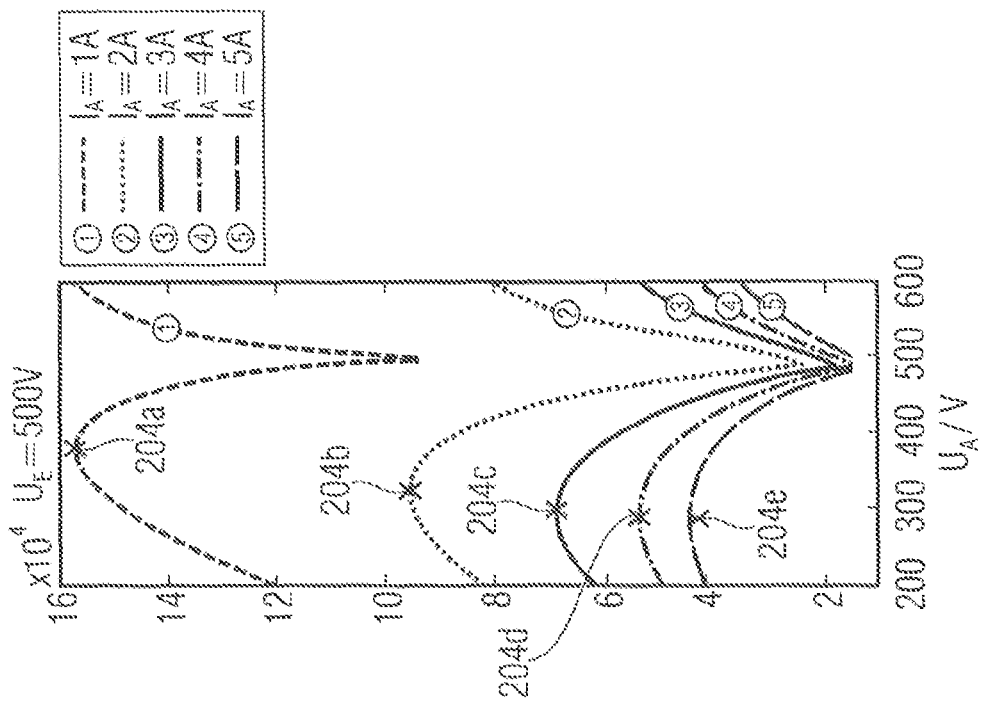
FIG. 6a-6c show schematic illustrations of curves of the switching frequency adjusted by the control unit across a varying output frequency of the switching DC-DC converter according to the first concept.
Figure 6B:
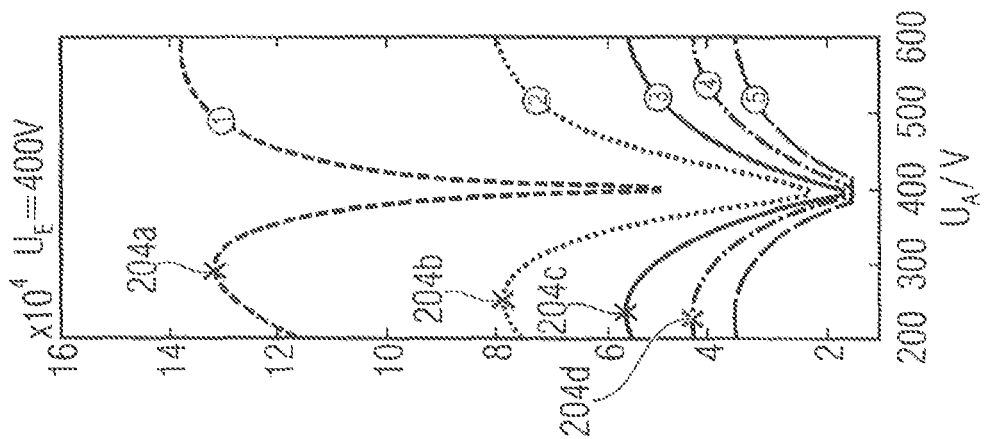
Figure 6C:
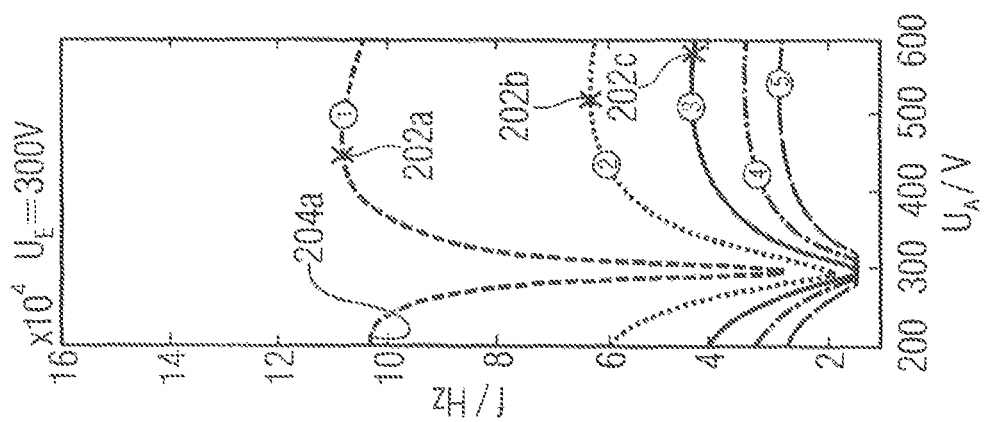

In the following, reference is made to the adaptation of the switching frequency. FIG. 6a to 6c show schematic curves of the switching frequency f set by the control unit across a varying output frequency $U_A$. FIG. 6a shows this curve for the input voltage $U_E=300V$, FIG. 6b for the input voltage $U_E=400V$ and FIG. 6 for the input voltage $U_E=500V$. Each of FIGS. 6a to 6c shows five curves indicated by 1 to 5 and having an increasing current strength of 1 A, 2 A, 3 A, 4 A and 5 A, respectively, with increasing numerical order. The control unit is configured to at first increase the switching frequency with decreasing or increasing output voltage starting from a situation where the output voltage $U_A$ corresponds to the input voltage $U_E$, i.e., starting from a value of the output voltage $U_A$ of 300V (FIG. 6a), 400V (FIG. 6b) and 500V (FIG. 6c). In other words, the control unit can be configured to adjust an at least locally minimum switching frequency when the voltages $U_A$ and $U_E$ are equal. The control unit is configured to increase the switching frequency until the output voltage $U_A$ has reached a reference value 202a-c or 204a-e. Here, the reference values 202i designate a reference value when increasing the output voltage. The reference values 204a designate a respective reference value when decreasing the output voltage $U_A$. When the output voltage has exceeded the reference value, i.e. when the output voltage $U_A$ is higher than the reference values 202i and lower than the reference values 204i, respectively, the control unit is configured to reduce the switching frequency. The control unit can be configured, for example, to detect the output voltage $U_A$, the input voltage $U_E$ and/or the current $I_A$ and to determine a switching frequency to be adjusted based thereon.

As shown in FIG. 6a to 6c, the control unit is configured, for example, to reduce the switching frequency with increasing positive current strength. With increasing input voltage $U_E$, the switching frequency f is increased. This means that the control unit is configured to determine the switching frequency in dependence on the input voltage $U_E$. The illustrated curves of the switching frequency to be adjusted have the same or comparable quality between the different current strengths. High efficiency can also be obtained without considering the current. Based thereon, additional consideration of the current can enable further improvement.

Further, the control unit is configured to reduce a reduction speed by which the switching frequency is increased with increasing current strength when the amount of the output current $I_A$ increases. The reducing speed can, for example, decrease in a linear manner, following a root function or in a square manner with increasing current amount value. The control means can be configured to increase the switching frequency with increasing input voltage $U_E$. The switching frequency f can be limited by the control unit 112 or by external influences. Maximum switching frequency can be influenced or can be dependent on the switching speed of the arranged power semiconductors $S_1$ to $S_4$. A minimum switching frequency f can be designed to reduce voltage ripples of the output voltage $U_A$ and/or to limit a volume of the circuit.

In other words, with an increase of the difference between the input voltage $U_E$ and the output voltage $U_A$, the control unit can be configured to quickly increase the switching frequency at first, i.e., until reaching a reference value 202i or 204i and then to reduce the same again. The control unit can be configured to reduce the switching frequency with an increase of the amount of the output current $I_A$.

Figure 7A:
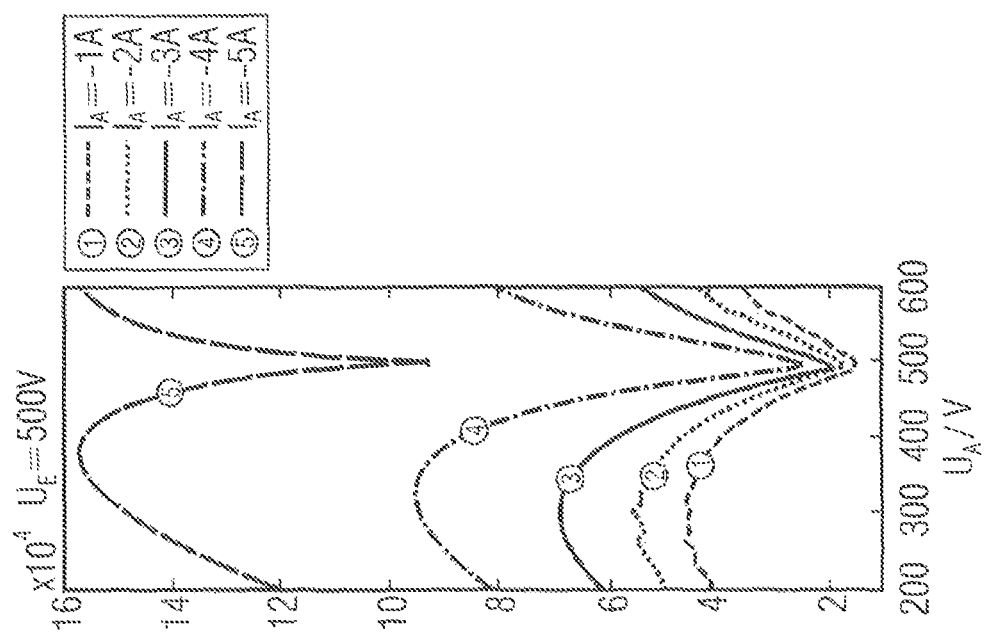
FIG. 7a-7c show curves of the switching frequency for negative output currents comparable to FIGS. 6a to 6c according to an embodiment.
Figure 7B:
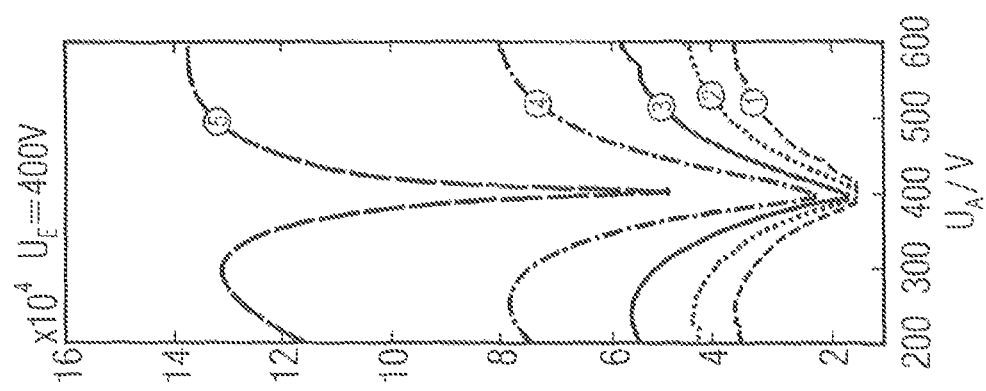
Figure 7C:
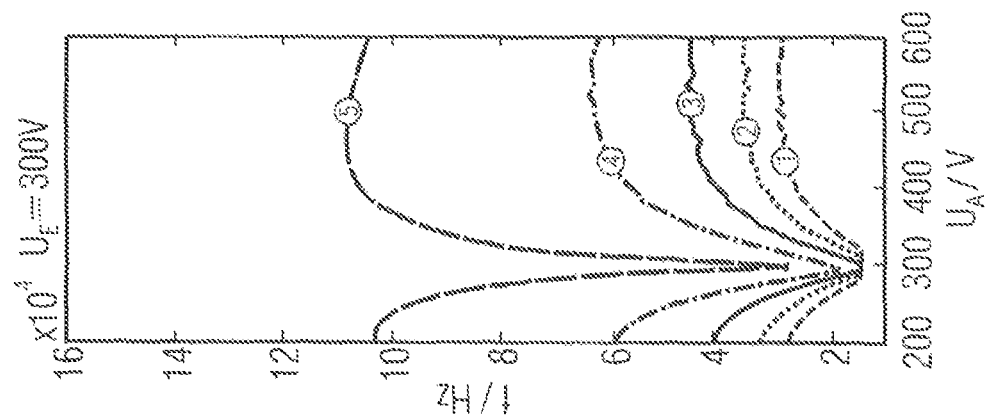

FIG. 7a to 7c show curves of the switching frequency f comparable to FIG. 6a to 6c. The combinations of output voltage $U_A$ and input voltage $U_E$ correspond to the respective FIGS. 6a, 6b and 6c. In increasing order, curves 1 to 5 show an increasing current value −5 A, −4 A, 3 A, −2 A to −1 A. If the amount value of the respective current strength is consulted, it becomes clear that the control unit is configured to reduce the switching frequency when the amount of the current value $I_A$ increases.

As illustrated in FIGS. 6a to 6c, with an increase of the voltage difference between input voltage $U_E$ and output voltage $U_A$, the control unit is configured to at first, steeply increase the switching frequency and then to reduce the same again relatively slowly. This means that starting from reference points 202i and 204i, respectively, an amount of a gradient in the direction of the situation that the input voltage $U_E$ corresponds to the output voltage $U_A$ is greater than an amount of a gradient in a direction away from this situation. Further, the control unit is configured to increase the switching frequency f when increasing the output current or an amount thereof. Above that, the control unit is configured to increase the switching frequency with an increase of the input voltage $U_E$. In FIGS. 6a to 6c, it can be seen for the cases $U_E=300V$, $I_A=5$ A and $U_E=400V$ and $I_A=5$ A that the control unit is configured to limit the switching frequency close to the operating points where the output voltage $U_A$ is equal to the input voltage $U_E$. Here, the minimum switching frequency is limited, for example, to 15 kHz.

The variation of the switching frequency f carried out by the control unit according to FIG. 7a to 7c corresponds essentially to the curves with a positive output voltage according to FIGS. 6a to 6c. With an increase of the amount of the output voltage $I_A$, the control unit can be configured to reduce the switching frequency f. The reduction speed can decelerate with the increase of the amount of the output current $I_A$.

Figure 8A:
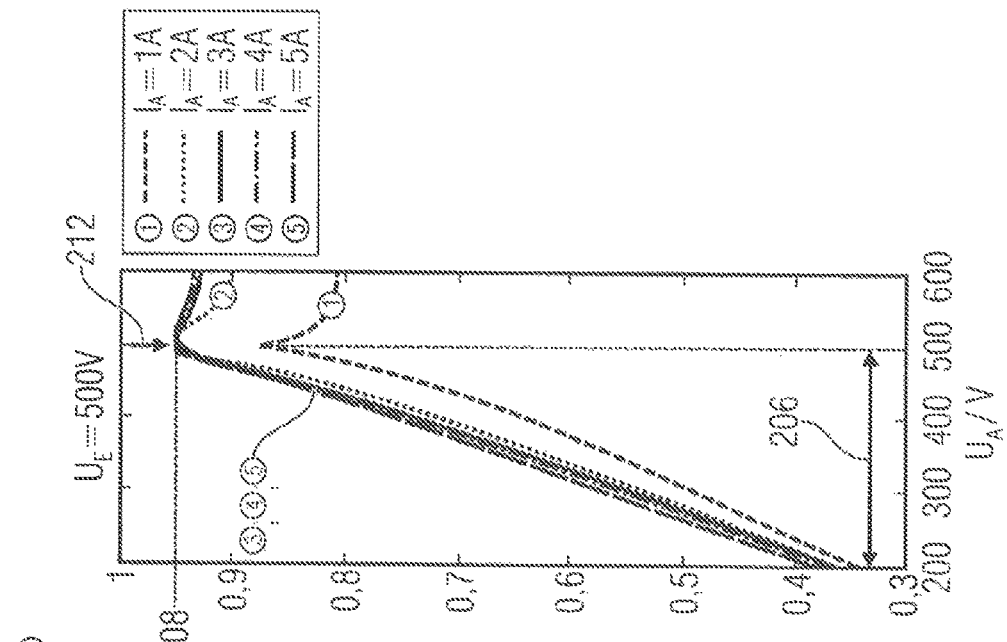
FIG. 8a-8c show schematic curves of a first duty cycle adjusted by the control unit according to the first concept of embodiments described herein.
Figure 8B:
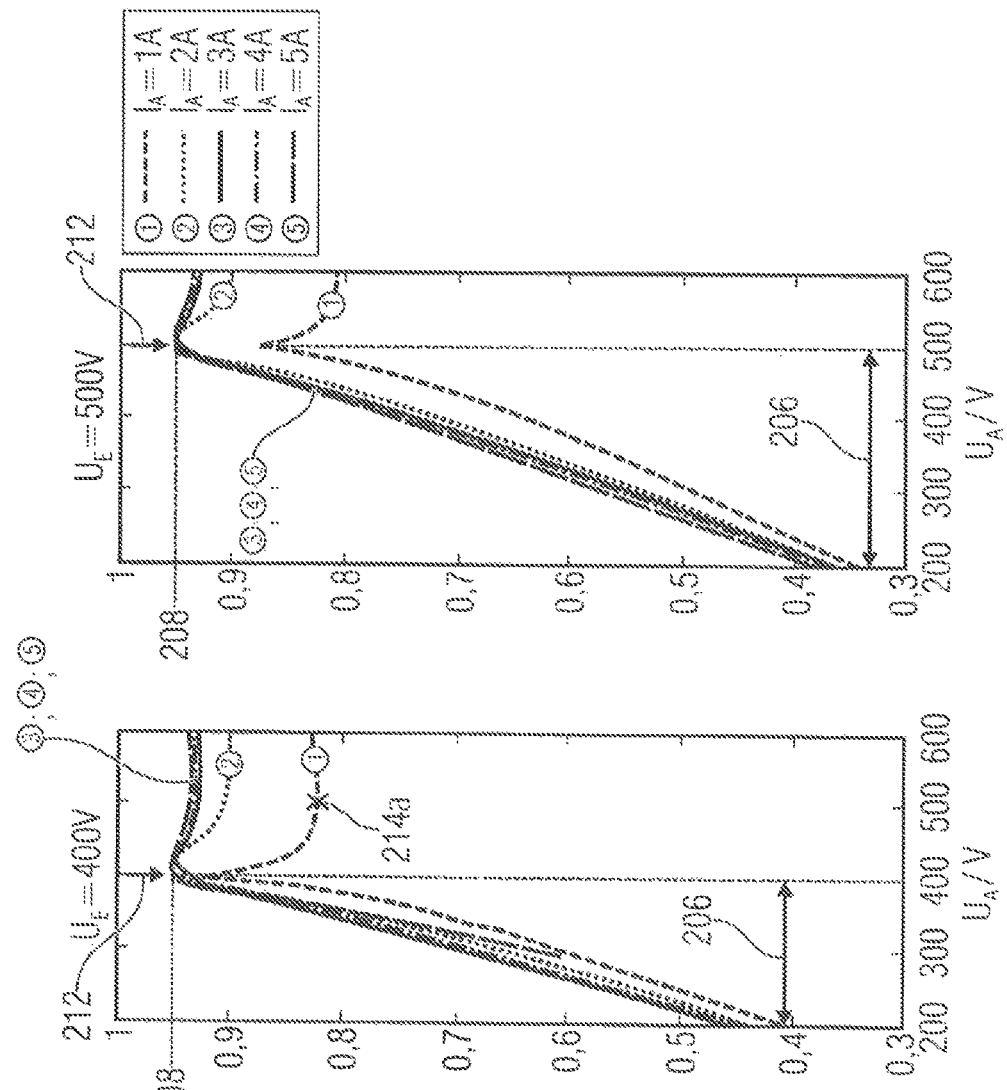
Figure 8C:
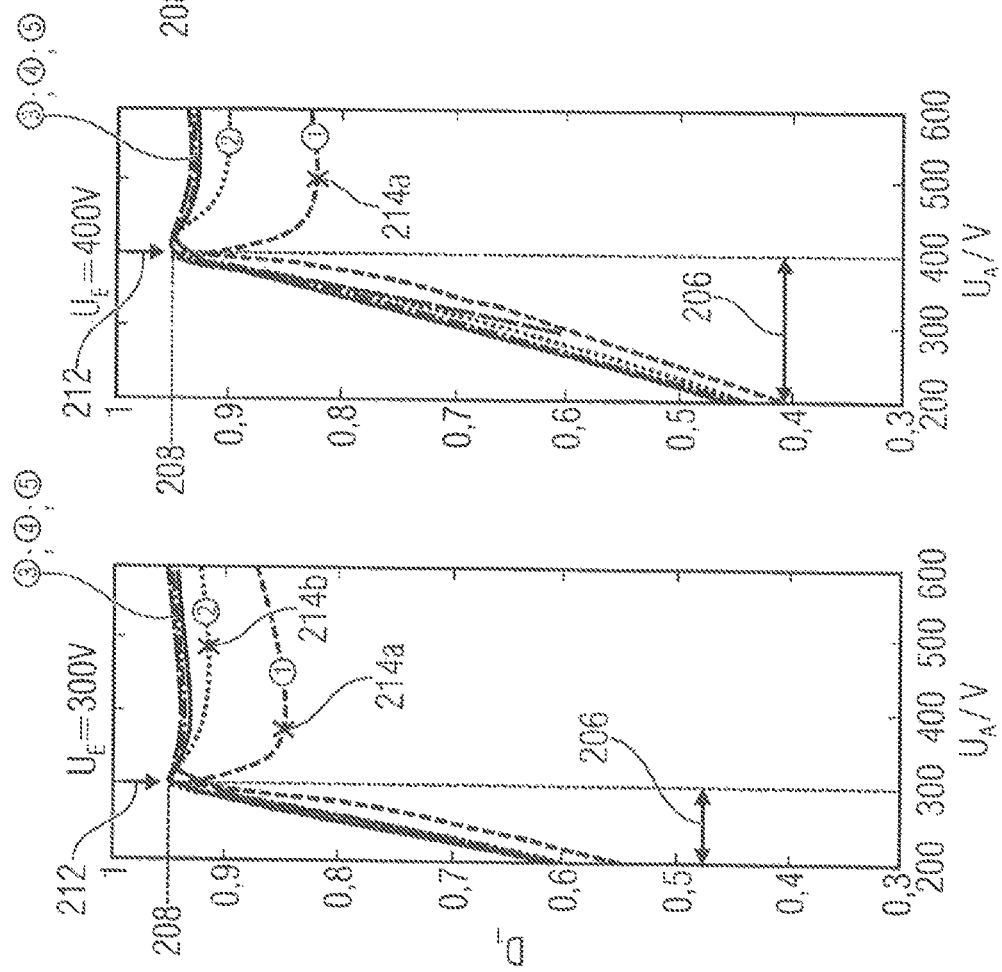

In the following, reference is made to the adjustment of the duty cycles by the control unit. As discussed, based on FIG. 8a-8c, the control unit is configured to increase the duty cycle $D_1$ with increasing output voltage $U_A$, starting from a situation 206 where the output voltage $U_A$ is lower than the input voltage $U_E$. The control unit is configured to increase the duty cycle $D_1$ such that a maximum value 208 is obtained in a situation 212 where the output voltage $U_A$ corresponds to the input voltage $U_E$.

With an output voltage $U_A$ rising above the situation 212, the control unit is configured, for example, to decrease the duty cycle $D_1$. An extent or intensity, i.e. speed of this reduction takes place to a lower extent than a reduction of the duty cycle $D_1$ during a reduction of the output voltage $U_A$ starting from the situation 212. Starting from the situation 212 towards the situation 206 to the same or comparable degree, the control unit can be configured to reduce the duty cycle $D_1$ like it had been increased starting from the situation 206 towards the situation 212.

In other words, the control unit can be configured to quickly increase the duty cycle $D_1$ with an increase of the output voltage $U_A$, when the output voltage $U_A$ is lower than the input voltage $U_E$. When the output voltage $U_A$ is greater than the input voltage $U_E$, the control unit is configured to reduce the duty cycle $D_1$ at first with an increase of the output voltage $U_A$ starting from the situation 212. If the output voltage $U_A$ exceeds a reference point 214a that can be determined for each combination of output voltage $U_A$, input voltage $U_E$ and output current $I_A$, the control unit can be configured to increase the duty cycle $D_1$ again slightly. At an operating point where the output voltage $U_A$ is equal to the input voltage $U_E$, the control unit can be configured to adjust the duty cycle $D_1$ according to the maximum value 208. The maximum value can, for example, lie in a range between 0.3 and 1, between 0.6 and 0.99 or between 0.9 and 0.97. Further, the control unit can be configured to increase the duty cycle $D_1$ with an increase of an amount value of the output current $I_A$ as can be seen, for example in FIG. 8c. With an increase of the difference between input and output voltage, the control unit is configured to reduce the duty cycle $D_1$. In a range where the output voltage is lower than the input voltage, the control unit is configured to quickly change the duty cycle $D_1$, i.e. to reduce the same. In the range where the output voltage is greater than the input voltage, the control unit is configured to change the duty cycle $D_1$ in a relatively slow manner.

FIG. 9a to 9c show schematic curves for the duty cycle $D_2$ adjusted by the control unit at a positive output current $I_A$. According to an embodiment, the control unit is configured to reduce the duty cycle $D_2$ with decreasing output voltage $U_A$ down to a minimum value 280, starting from a situation 216 where the output voltage $U_A$ is greater than the input voltage $U_E$. The minimum value 218 can be adjusted, for example, by the control unit when the situation 212 exists, i.e. when the output voltage $U_A$ corresponds to the input voltage $U_E$. Starting from the situation 212, the control unit can be configured to increase the duty cycle $D_2$ to a lesser extent with decreasing output voltage $U_A$ than with increasing output voltage $U_A$. For example, each curve shape 1 to 5 of the respective FIGS. 9a, 9b and 9c, respectively can indicate a curve of the duty cycle $D_2$ adjusted by the control unit that is adjusted when the output voltage $U_A$, the input voltage $U_E$ and the output current $I_A$ are applied. Further, the control unit can be configured to adjust the duty cycles $D_1$ and/or $D_2$ such that the condition $U_A/U_E = D_1/(1-D_2)$ is essentially fulfilled. This means that the condition is fulfilled at least in a tolerance range of at most 15%, at most 10% or at most 5% for the duty cycles $D_1$ and/or $D_2$.

In other words, the control unit can be configured to at first increase the duty cycle $D_2$ with increasing of the output voltage $U_A$ and to then reduce the same when the output voltage $U_A$ is lower than the input voltage $U_E$. The reduction can be made up to an operating point where the output voltage $U_A$ is equal to the input voltage $U_E$. When the output voltage $U_A$ is greater than the input voltage $U_E$, the control unit can be configured to quickly increase the duty cycle $D_2$ with increasing the output voltage $U_A$. In the operating point where the output voltage $U_A$ is equal to the input voltage $U_E$, the control unit is configured to adjust the minimum duty cycle 280. The minimum value can be, for example, in a range between 0 and 1, between 0.01 and 0.3 or between 0.015 and 0.2. A value of the duty cycle $D_2$ can be related to the value of the duty cycle $D_1$ via the relation indicated in equation 3, such that a duty cycle can be determined by another determined duty cycle. With increasing the amount of the output current $I_A$, the control unit is configured to reduce the duty cycle $D_2$, as it can be seen, for example in FIGS. 9a to 9c between curves 1 and 2.

In the following, reference is made to an adjustment of the time delay $t_v$ by the control unit.

Figure 10:
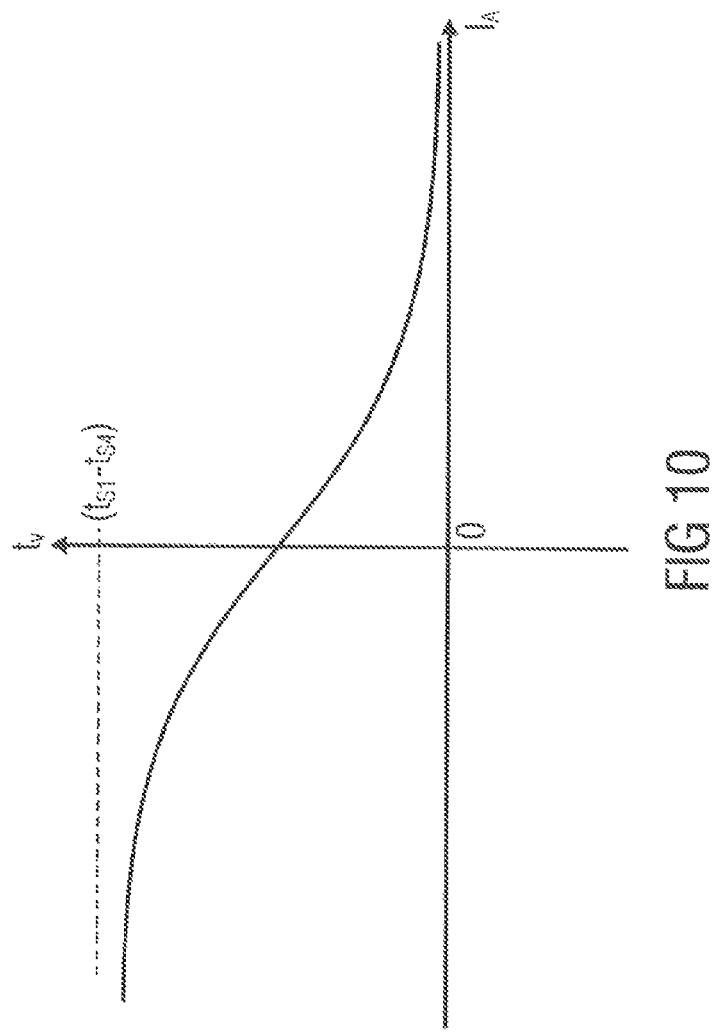
FIG. 10 shows schematically a course of a time delay between switching operations adjusted by the control unit according to the first concept of embodiments described herein.

FIG. 10 shows schematically a curve of a time delay $t_v$ adjusted by the control unit across a curve of the output current $I_A$. The control unit is configured to reduce the time delay with increasing output current $I_A$. For example, the curve of the time delay $t_v$ can be asymptotic against the value of a time difference of the time durations $t_{s1}$-$t_{s4}$ at negative output currents $I_A$. With positive output currents, the value can proceed towards a value of zero in an asymptotic manner. Alternatively, a value greater than zero can be implemented as minimum value and/or a lower value $t_v$ than $(t_{s1}$-$t_{s4})$ can be implemented as maximum value. As an alternative to the illustrated curve, also, a linear or any other curve of the time delay can be implemented by the control unit. With respect to the above-mentioned known concepts, an above described adaptation of the switching frequency, the duty cycles and the time delay enables high efficiency of the buck-boost converter to be obtained, since hard switching of the switches is omitted. The control unit can be configured to increase the time delay $t_v$ at a negative output current $I_A$ of the switching DC-DC converter when the amount of the output current $I_A$ increases. The control unit can be configured to reduce the time delay $t_v$ at a positive output current $I_A$ of the switching DC-DC converter when the amount of the output current $I_A$ increases.

In other words, the control unit can be configured to reduce the time delay $t_v$ with an increase of $I_A$ at a positive output current $I_A$, up to equal to or slightly greater than zero. At a negative output current, the control unit is configured to increase the time delay $t_v$ with an increase of the amount of $I_A$ up to equal to or slightly lower than the value $t_{s1}$-$t_{s4}$.

For illustrating the efficiency that can be obtained, some mathematical explanations will follow. For obtaining maximum efficiency of a buck-boost converter, minimizing the power losses $P_v$ in the buck-boost converter is needed. The power losses $P_v$ consist mainly of the following parts:
Switching losses $P_{SS}$ in the switches
Forward losses $P_{SD}$ in the switches
Core losses $P_{LK}$ in the storage choke
Forward losses (or ohmic losses) $P_{LD}$ in the storage choke
Losses $P_{CE}$ in the input capacitor.
Losses $P_{CA}$ in the output capacitor
The power losses can be illustrated as $$P_V = P_{SS} + P_{SD} + P_{LK} + P_{LD} + P_{CE} + P_{CA} \tag{10}$$

With the concepts described herein, the conditions of equation 9 can be fulfilled, such that the switches $S_1$ to $S_4$ can be switched in a manner enhanced by ZVS, i.e. approximately lossless. Under these conditions it results approximately that $P_{SS}=0$.

Further, the forward losses in the switches and in the storage choke, the core losses in the storage choke and the losses in the input and output capacitors all depend on the course of the storage choke current $I_L$. The lower the effective value $I_{L,eff}$ of $I_L$, the lower the losses $P_{SD}$, $P_{LK}$, $P_{LD}$, $P_{CE}$ and $P_{CA}$. Consequently, the effective value $I_{L,eff}$ can be minimized under the two conditions of equation 9 in order to obtain high to maximum efficiency.

Above that, it can be stated that, at an operating point ($U_E$, $U_A$, $I_A$), the effective value $I_{L,eff}$ is a function of the switching frequency f, the time delay $t_v$ and the duty cycles $D_1$ and $D_2$. The effective value $I_{L,eff}$ can, for example, be defined as a function as follows:

$$I_{L,eff}(x), x = \{x_1 = f, x_2 = t_V, x_3 = D_1, x_4 = D_2\} \tag{11}$$

By considering the condition according to claim 3 for the duty cycles $D_1$ and $D_2$, the following illustrated optimization problem can also be formulated and solved in order to obtain the high and maximum efficiency, respectively, at an operating point ($U_E$, $U_A$, $I_A$):

Minimizing of $I_{L,eff}(x)$, $x = \{x_1 = f, x_2 = t_V, x_3 = D_1, x_4 = D_2\}$ (12)

under:

Condition 1: $\max(i_L(t_2), i_L(t_{13})) \le -I_0$

Condition 2: $\min(i_L(t_6), i_L(t_9)) \ge -I_0$

Condition 3: $\dfrac{x_3}{1-x_4} = \dfrac{U_A}{U_E}$

Condition 4: $0 \le x_2 \le \dfrac{x_3 - x_4}{x_1}$

The above described optimum switching frequencies, optimum time delay and optimum duty cycles can represent solutions of this optimization problem.

According to equations 9 and 12, a value $I_0$ is part of the optimization problem. Advantageously, the value of the current $I_0$ lies within a value range that can be considered as moderate, i.e. greater than zero, but lower than a maximum value. In that way, the effect can occur that capacitances $C_1$ to $C_4$ are not recharged within the dead times when the current $I_0$ is lower than needed. This can have the effect that the switches are not switched in a manner enhanced by ZVS, i.e. in a low-loss or lossless manner. When the value of the current $I_0$ is greater than needed, the switches $S_1$ to $S_4$ can be switched in a lossless manner. However, the effective value $I_{L,eff}$ can become greater than needed, such that the efficiency of the DC-DC converter is decreased. A suitable value of the current Io can be determined, for example, as described below.

Figure 11:
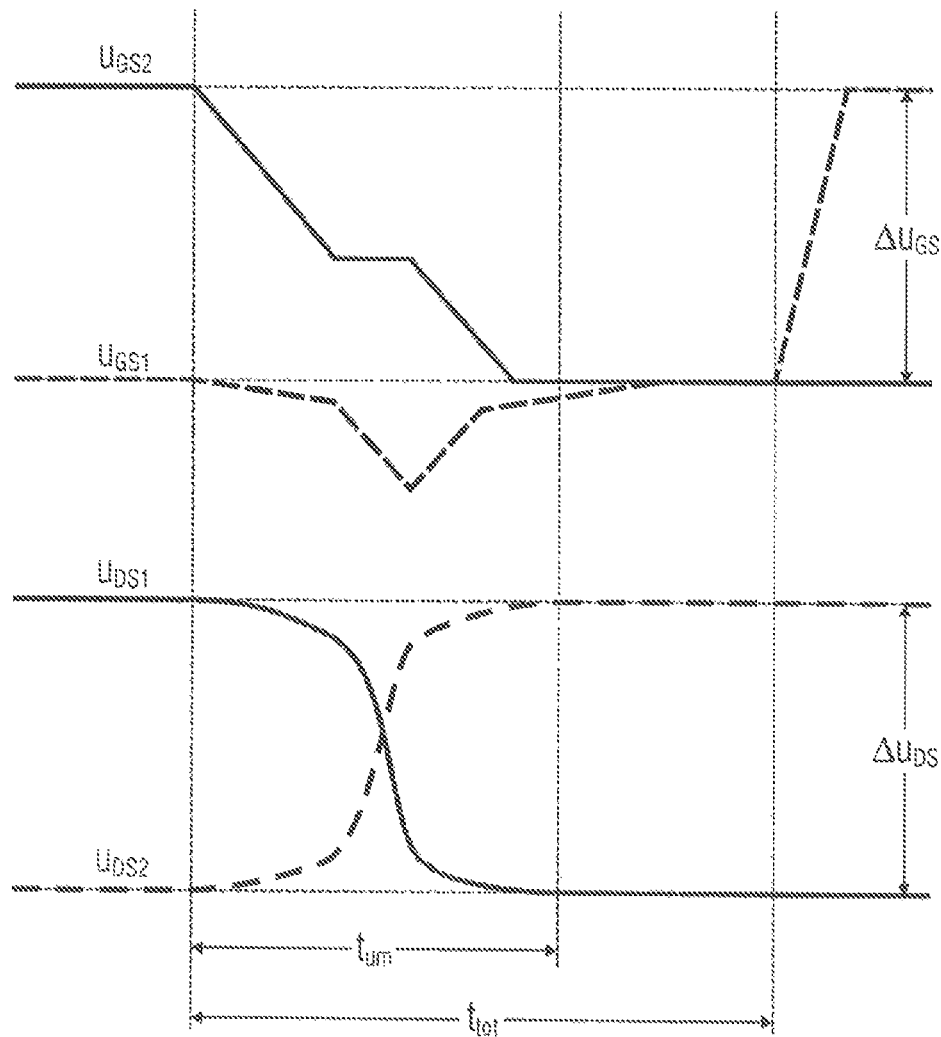
FIG. 11 shows voltage curves of a commutation operation during a dead time between switching off a switch and switching on a different switch of the switched DC-DC converter according to the first concept of embodiments described herein.

Assuming that MOSFETs are used as switches for the buck-boost converter, the voltage curves of a commutation operation during the dead time $t_{dead}$ between switching off switch $S_2$ and switching on switch $S_1$ can be as illustrated in FIG. 11. In the illustrated curves, $u_{GS1}$ is the gate-source voltage of the switch $S_1$, $u_{GS2}$ is the gate-source voltage of the switch $S_2$, $u_{DS1}$ is the drain-source voltage of the switch $S_1$, $u_{DS2}$ is the drain-source voltage of the switch $S_2$, $\Delta u_{GS}$ is the change of the gate-source voltage, $\Delta u_{DS}$ is the change of the drain-source voltages, $t_{dead}$ is the dead time and $t_{re}$ is the time duration of recharging the capacitances. During a time period $t_{re}$, the capacitances $C_1$ and $C_2$ are completely recharged by the storage choke current $i_L$. Since the change of the current $i_L$ within the dead time is very small, it can be assumed that $i_L$ remains constant within $t_{re}$ and is equal to a value $I_{L,dead}$. In that way, it can apply that:

$$I_{L,death}2 \cdot = \dfrac{\Delta Q_{oss}}{t_{um}} \quad (13)$$

$\Delta Q_{OSS}$ indicates the change of the amount of charge in an output capacitance $C_{OSS}$.

The output capacitance $C_{OSS}$ of an MOSFET can be formulated as a function of the drain-source voltage $u_{ds}$, such that the following applies:

$$C_{OSS} = f(u_{DS}) \quad (14)$$

Accordingly, the change of the amount of charge $\Delta Q_{OSS}$ is linked to a change of the drain-source voltage $\Delta u_{DS}$:

$$\Delta Q_{OSS} = \int_0^{\Delta u_{DS}} C_{OSS} du_{DS} = \int_0^{\Delta u_{DS}} f(u_{DS}) du_{DS} \quad (15)$$

By inserting equation 15 into equation 13, the following results:

$$I_{l,tot} = 2 \cdot \dfrac{\int_0^{\Delta u_{DS}} f(u_{DS}) du_{DS}}{t_{um}} \quad (14)$$

Since the change of the drain-source voltage $\Delta u_{DS}$ of switches $S_1$ and $S_2$ is equal to the input voltage $U_E$ and the change of a respective voltage of switches $S_3$ and $S_4$ is equal to the output voltage $U_A$, the greater value between $U_E$ and $U_A$ can be inserted for $\Delta u_{DS}$ for determining a suitable value of the current $I_0$. Above that, it may be essential that the recharge time $t_{re}$ is shorter than the dead time $t_{dead}$. This results in:

$$I_{l,tot} \ge 2 \cdot \dfrac{\int_0^{\max(U_E, U_A)} f(u_{DS}) du_{DS}}{t_{tot}} \quad (17)$$

Thus, an optimum value for $I_0$ results in:

$$I_0 = 2 \cdot \dfrac{\int_0^{\max(U_E, U_A)} f(u_{DS}) du_{DS}}{t_{tot}} \quad (18)$$

The above-described concept for switching switches of a switched DC-DC converter enables high efficiency as illustrated by FIG. 12a to 12c for a positive output current $I_A$ and in FIGS. 13a to 13c for negative output currents $I_A$. In all Figures, the switched buck-boost converter accordingly obtains an efficiency η of more than 99.5% for the case that the input voltage $U_E$ is equal to the output voltage $U_A$. With the reduction of the amount of the output current, the efficiency increases. In most operating points, an efficiency of more than 99% can be obtained.

FIG. 14 shows a comparison of efficiencies between the above-described concept for switching a switching DC-DC converter and a known concept according to conventional technology. The comparison has been performed, among others, under the following conditions: the same MOSFET was used for the switches, the input voltage $U_E$ is 400V, the output current $I_A$ is 3 A. The output voltage is varied between 200V and 600V. In all illustrated operating points, a curve 222 of the efficiency η is greater than a curve 224 of the efficiency η of a hard switching concept.

In the following, reference is made to a further concept for driving switches $S_1$ to $S_4$ as it can be implemented by the control unit 112. The control unit can be configured to control switches $S_1$ and $S_2$ by complementary signals PWM1H and PWM1L. The switching time of $S_1$ within a switching period T is $t_{S1}$, i.e. within the switching period T, the switch $S_1$ is switched to be conductive for the time duration $t_{S1}$. The switch-on time of the switch $S_2$ within the switching period is $t_{S2}$. Switches $S_4$ and $S_3$ are controlled by the complementary signals PWM2H and PWM2L. The switch-on time of the switch $S_4$ within a switching period T is $t_{S4}$. The switch-on time of the switch $S_3$ within a switching period is $t_{S3}$. According to the second concept, the switch-on times of switches $S_1$ and $S_4$ are essentially identical, such that $t_{S2}=t_{S4}$ applies approximately, i.e. within a tolerance range of at most 15%, at most 10% or at most 5%. Accordingly, it can also apply that the switch-on time of switches $S_2$ and $S_3$ is essentially identical, such that $t_{S2}=t_{S3}$ applies approximately. This means that, according to the second concept, the control unit is configured to determine and/or adjust the first duty cycle and the second duty cycle such that the first duty cycle corresponds to the second duty cycle in each operating point of the switched voltage converter. This is fulfilled, for example, for $D_1$ equal to 0.5. Here, the control unit can perform a variation of the time delay $t_v$ amended with respect to the above-described concept. As described based on FIGS. 15a and 15b, starting from a time instant 0 when the switch $S_1$ is switched on, the time delay can be negative, this means switch $S_4$ is switched on prior to switch $S_1$ and is switched on at the time instant 0. This applies, as indicated for example in FIG. 15a, to positive output currents $I_A$. If negative output currents $I_A$ exist, the time delay $t_v$ can be positive, this means switch $S_4$ is switched on after switch $S_1$ and is switched off at the time instant 0. In other words, at a positive output current (see FIG. 15a), the control unit can be configured to switch on switch $S_4$ earlier than switch $S_1$.

It can be defined, for example, that the switch-on time of the switch $S_1$ indicates the time instant 0 and the switch-on time instant of the switch $S_4$ is $t_i$. In this case, $-t_{S1} < t_i < 0$ applies. An order of switching operations of the switches in this case can read as follows: $S_4$ switched on; $S_2$ switched off; $S_1$ switched on; $S_4$ switched off and $S_3$ switched on; $S_1$ switched off; $S_2$ switched on; $S_3$ switched off; $S_4$ switched on.

Figure 15A:
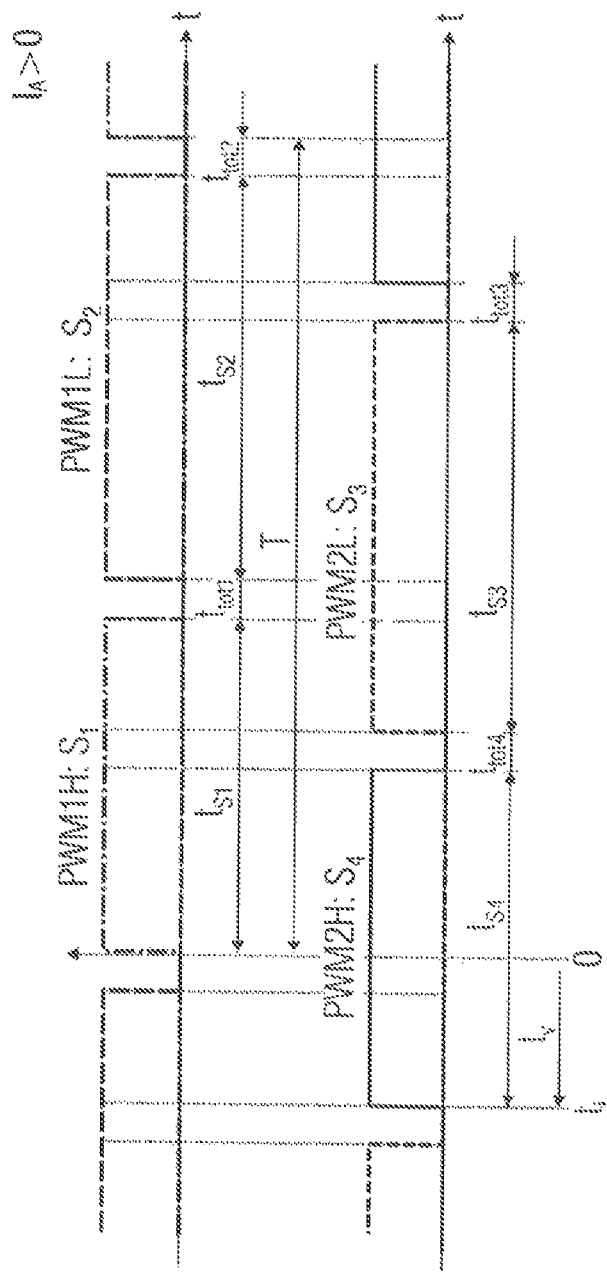
FIG. 15a-15b show a schematic view of a variation of the time delay according to a second concept of embodiments described herein for driving a switching DC-DC converter.
Figure 15B:
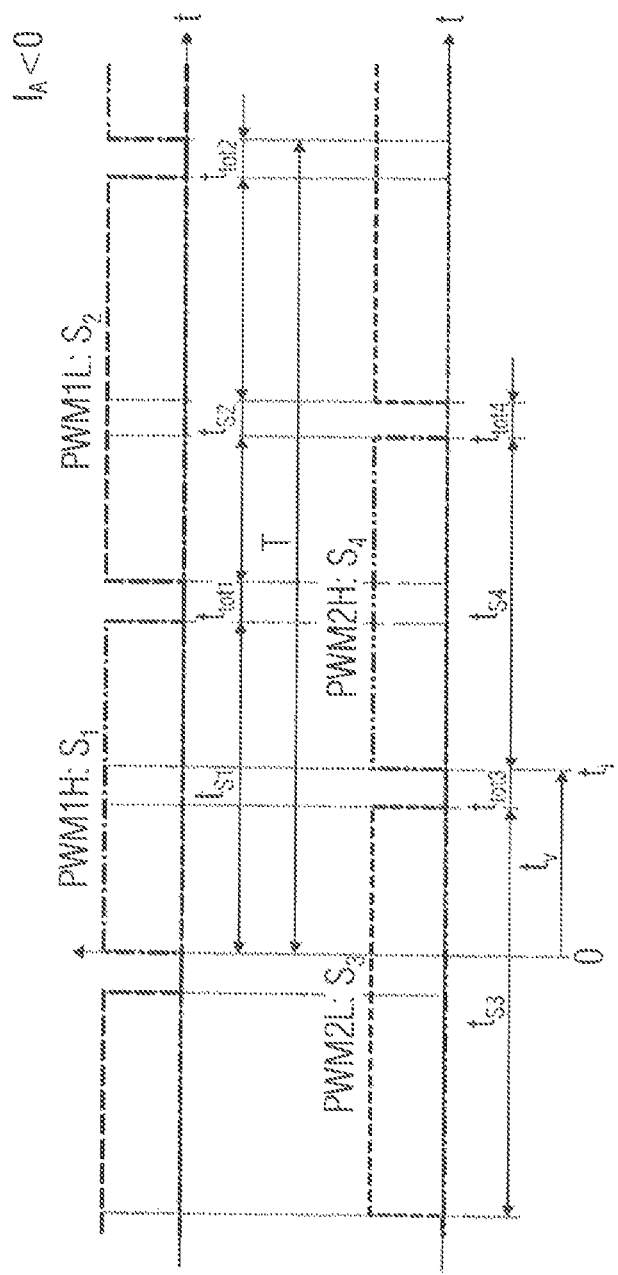

At a negative output current, as illustrated in FIG. 15b, switch $S_4$ can be switched on later than switch $S_3$. When it is defined again that the switch-on time of switch $S_1$ is zero and the switch-on time of switch $S_4$ is indicated by $t_1$, $0 < t_i < t_{S1}$ can apply. The order of the switching operations of the switches can then read as follows: $S_1$ switched on; $S_3$ switched off; $S_4$ switched on; $S_1$ switched off; $S_2$ switched on; $S_4$ switched off; $S_3$ switched on; $S_2$ switched off; $S_1$ switched on.

For the duty cycles adjusted by the control unit, $D=t_{S1}/T=t_{S4}/T$ can apply, such that based on the voltage transformation ratio, a connection to the duty cycle D can be determined according to:

$$\frac{U_A}{U_E} = \frac{D}{1-D} \quad (19)$$

Figure 16A:
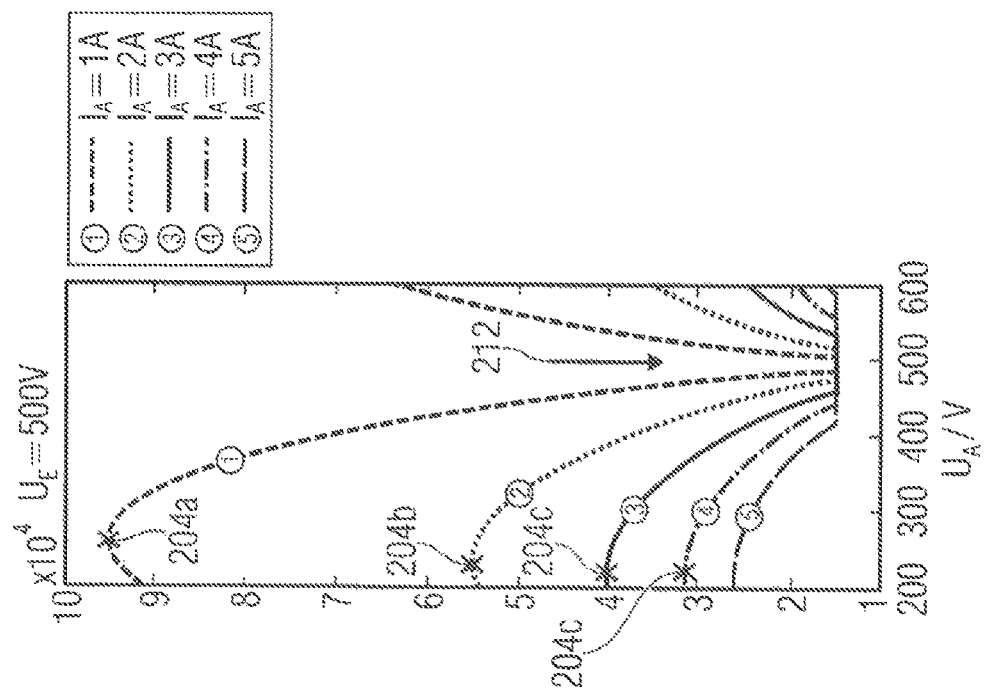
FIG. 16a-16c show curves of switching frequencies by which the switches of the switching DC-DC converter can be controlled by the control unit according to the second concept of embodiments described herein.
Figure 16B:
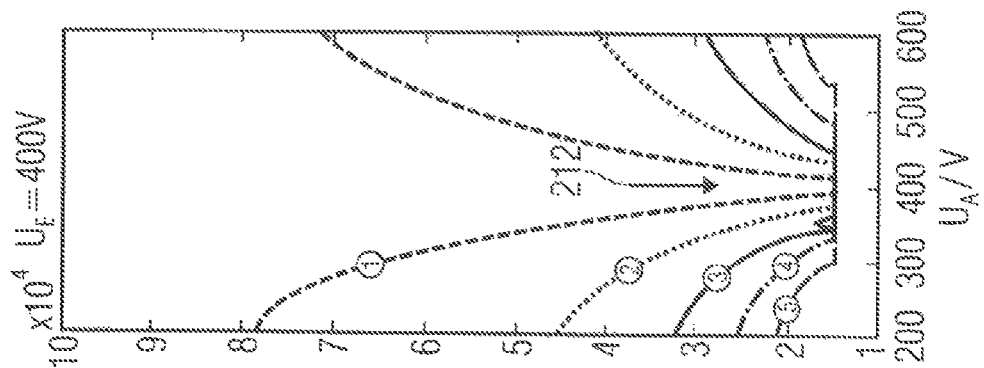
Figure 16C:
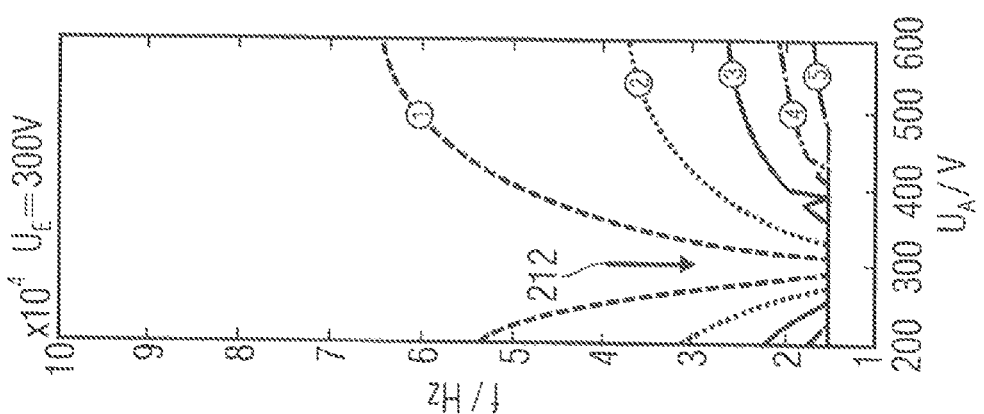

FIGS. 16a to 16c show curves of switching frequencies by which the switches of the switching DC-DC converter can be controlled by the control unit according to the second concept. As described in connection with FIGS. 6a to 6c, the control unit can be configured to quickly increase the switching frequency f when the difference between the input voltage $U_E$ and the output voltage $U_A$ is increased and to reduce the same again after passing reference points 204a-d. Above that, the control unit can be configured to reduce the switching frequency f according to the second concept when the amount of the output current $I_A$ increases. As described in connection with FIGS. 6a to 6c and 7a to 7c, the control unit can be configured to reduce the reduction speed by which the switching frequency is decelerated when the amount of the output current $I_A$ increases, with an increase of the amount of the output current $I_A$. Further, the control unit can be configured to gradually increase the switching frequency f when the input voltage $U_E$ increases. Analogously to the first concept, it can also apply for maximum and minimum switching frequencies that the control unit is configured to select the maximum switching frequency based on a used power semiconductor. The minimum switching frequency can be selected by the control unit such that ripples of the output voltage and/or a volume of the circuit is limited. Compared to the above-described first concept, the optimum switching frequencies illustrated in FIGS. 16a, 16b and 16c, respectively, determined by the control unit are significantly lower although the same inductance L is arranged.

Differences between the concepts result, for example, when determining the time delay by the control unit.

As described in connection with FIG. 15a, at a positive output current $I_A$, the control unit can be configured to switch on switch $S_4$ prior to switch $S_1$. As described in connection with FIG. 15b, at a negative output current, the control unit, can be configured to switch on switch $S_4$ later than switch $S_1$. For the time delay $t_v$, it can apply, for example that $$|t_v| = |0 - t_i| \text{ with } t_i = \alpha \cdot T \quad (20)$$

wherein $\alpha$ is the time delay factor.

FIGS. 17a to 17c show schematic curves of a time delay factor a at respectively different ratios between the output voltage $U_A$ and the input voltage $U_E$ and across different values of a positive output current $I_A$. FIGS. 18a to 18c show respective curves of the time delay factor $\alpha$ for negative values of the output current $I_A$. The time delay $t_v$ can be illustrated, for example, as $\alpha$ multiplied with the period duration T, this means $t_v = \alpha T$. For positive output currents $I_A$, the time delay factor a can have a negative value as can be seen in FIG. 17a to 17c. For negative output currents $I_A$, the time delay factor a can have positive values as can be seen in FIGS. 18a to 18c. If, for example, FIG. 17a is compared to FIG. 18a, FIG. 17b to FIG. 18b or FIG. 17c to FIG. 18c, it becomes clear that the respective values of the time delay factor $\alpha$ can be essentially mirrored at an abscissa having the value of zero for the time delay factor $\alpha$.

For each curve 1 to 5 in each of the diagrams of FIGS. 17a to 17c and 18a to 18c, there is a range 222i that includes the situation 212, i.e. the output voltage $U_A$ corresponds to the input voltage $U_E$. With increasing amount value of the current $I_A$, the range 222i can include a greater range of the output voltage $U_A$. Within the range 222i, the control unit is configured to leave the time delay factor $\alpha$ essentially unamended. Starting from ranges 222i, the control unit is configured, for example to reduce an amount value of the time delay factor $\alpha$ within increasing or decreasing output voltage $U_A$. This means a time difference between the switching operations of switch $S_1$ and switch $S_4$ is reduced. The control unit can be configured to determine the amount value of the time delay factor in a range between 0 and 1, between 0 and 0.8, between 0 and 0.65 or in a range between 0 and 0.5. The control unit can be configured to reduce an amount value of the time delay factor with increasing output current strength $I_A$.

This means the control unit can be configured to modulate the time delay factor a according to FIGS. 17a to 17c at a positive output current. At a negative output current, the control unit can be configured to modulate the time delay factor $\alpha$ according to FIGS. 18a to 18c. This can also be considered such that the control unit can be configured to switch on switch $S_1$ at a positive output current $I_A$ of the switching DC-DC converter while switch $S_4$ is switched on, cf. FIG. 15a, and to reduce the same by an amount of the time delay $t_v$ when the amount of the output current $I_A$ increases, cf. FIGS. 17a to 17c. Alternatively or additionally, the control unit can be configured to switch on switch $S_4$ at a negative output current $I_A$ of the switching DC-DC converter while switch $S_1$ is switched on, cf. FIG. 15b and to increase the amount of the time delay $t_v$ when the amount of the output current $I_A$ increases, cf. FIGS. 18a to 18c.

FIGS. 19a to 19c show schematically an obtainable efficiency η when the control unit is configured to implement the second concept for a positive output current $I_A$. FIGS. 20a to 20c show a respective efficiency η in percent for negative output currents $I_A$. In all cases, an efficiency of more than 99.8% can be obtained.

In summary, the first concept can be described such that the switches of a half bridge are clocked complementarily to one another while considering a dead time, i.e. switch $S_1$ is switched complementarily to the switch $S_2$ and the switch $S_4$ is switched complementarily to switch $S_3$. The switch $S_4$ of the second half bridge used as low-side-switch is, for example only switched on during the switch-on state of the high-side-switch $S_1$ of the first half bridge and then switched off.

Under these conditions, a voltage order, $U_E$–$U_A$; $U_E$; $U_E$–$U_A$; –$U_A$ is applied to the storage choke, cf. FIG. 5c. In dependence on the operating points ($U_E$, $U_A$, $I_A$), the switching frequency f, the time delay $t_v$ and the duty cycles $D_1$ and $D_2$ are adapted, i.e. modulated. Thereby, it is obtained that the four switches are switched in a voltage-free manner or in a low-loss or lossless manner, respectively, in all operating points. In that way, the losses can be minimized. Under this condition, the effective value of the storage choke current is also minimized. The losses in the storage choke by the forward losses in the switches are reduced and optimized, respectively.

The adaptation (modulation) of the switching frequency f is characterized among others, in that for $U_A/U_E$<1 the switching frequency is at first increased with increasing output voltage $U_A$ and then the switching frequency f decreases again with increasing output voltage $U_A$. Close to the point $U_A/U_E$=1, the switching frequency f reaches a minimum. For $U_A/U_E$>1, the switching frequency f is at first increased with increasing output voltage $U_A$ and for greater output voltages $U_A$ (greater than a reference point) decreased again. With the same input voltage $U_E$ and output voltage $U_A$, the switching frequency f can be reduced with an increase of the amount of the output current $I_A$. The switching frequency f can be limited. The maximum switching frequency can depend on a switching velocity of the arranged power semiconductors. The minimum switching frequency can be selected such that ripples of the output voltage $U_A$ and the volume of the circuit, respectively, are limited.

The adaptation (modulation) of the duty cycle $D_1$ is, among others, characterized in that the duty cycle $D_1$ is increased with an increase of the output voltage $U_A$ when the output voltage is lower than the input voltage $U_A$. When $U_A$>$U_E$, the duty cycle $D_1$ can first be reduced with an increase of the output voltage $U_A$ and then slowly increased. In a voltage range where $U_A$=$U_E$ applies approximately, the duty cycle $D_1$ can be maximum. With an increase of the amount of the output voltage $I_A$, the duty cycle $D_1$ can be increased (with otherwise equal voltages).

The adaptation (modulation) of the duty cycle $D_2$ is characterized, among others, in that the duty cycle $D_2$ is increased at first with an increase of the output voltage $U_A$ and then reduced when $U_A$<$U_E$ applies. When $U_A$>$U_E$, the duty cycle $D_2$ can be increased with an increase of the output voltage $U_A$. Close to the range where $U_A$=$U_E$ applies, the duty cycle $D_2$ can be minimum. With an increase of the amount of the output current $I_A$, the duty cycle $D_2$ can be reduced.

According to this concept, the adaptation (modulation) of the time delay $t_v$ is characterized, among others, in that at a positive output current $I_A$ the time delay $t_v$ is reduced with increasing output voltage $I_A$. At a negative output current $I_A$, the time delay $t_v$ is increased with increasing amount of the output current $I_A$.

On the other hand, the second concept that can be implemented by the control unit can be described such that the switches of one half bridge each are clocked complementarily with consideration of a dead time, i.e. switch $S_1$ is switched complementarily to switch $S_2$ and switch $S_4$ is switched complementarily to switch $S_3$. The time duration of the switch-on state of switch $S_1$ is equal to the time duration of the switch-on state switch $S_4$ within a tolerance range. The time duration of the switch-on state of the switch $S_2$ is equal to the time duration of the switch-on state of switch $S_3$ within a tolerance range. At a positive output current $I_A$, switch $S_4$ is switched on earlier than switch $S_1$. At a negative output current, switch $S_4$ is switched on later than switch $S_1$. In dependence on the operating points ($U_E$, $U_A$, $I_A$) the switching frequency f, the time delay $t_v$ and the duty cycle D are adapted, i.e. modulated. Thereby, it is obtained that the four switches $S_1$-$S_4$ are switched in a voltage-free manner, i.e. in a low-loss or lossless manner at all operating points. In that way, switching losses can be reduced or minimized. Under this condition, the effective value of the storage choke current is also reduced or minimized. Thus, the losses in the storage choke and the forward losses in the switches are optimized.

A driving unit and/or a switched DC-DC converter according to embodiments described herein, can be configured to control the switches according to the first concept or according to the second concept. A different driving unit and/or a differently switched DC-DC converter according to embodiments described herein can be configured to control the switches according to the first concept and according to the second concept. In that way, the concepts can be executed, for example in a time-alternating manner. The first concept offers the advantage that a higher degree of efficiency can be obtained. For this, at least four parameters, the switching frequency, the two duty cycles and the time delay are modulated. Contrary to this, the second concept allows savings with respect to computing efforts and/or storage efforts, since at least three parameters, the switching frequency, an equal duty cycle and the time delay are modulated. For example, the first concept can be executed first and subsequently the second concept.

Although the above-described embodiments indicate an input side and an output side of the switching DC-DC converter, it should be noted that these indications can be mutually exchangeable based on a symmetrical set-up of the switching DC-DC converter. This is obtained, among others, by a simple alternation between the boost mode and the buck mode when the input side and the output side are exchanged.

Although in the above embodiments the term time instant is used, such as for switching operations in switches, it should be noted that these time-instants describe time durations of short finite lengths. In that way, a time instant of switching a switch can be considered as time interval where a switch transitions from one state to another state.

Although in the above embodiments the input voltage is represented in a variable manner in step widths of 100 V, the input voltage can be variable in any step widths or without step widths.

The above described curve shapes shown in the figures are to be considered rather exemplarily and qualitatively, but not quantitatively. It is obvious that in other implementations as the ones described herein, other currents, other voltages, other duty cycles, other frequencies or other degrees of efficiency can be obtained. Also, for example, curve shapes that are illustrated analogously or continuously can be described in a quantized manner or can be stored in a storage.

Although some aspects have been described in the context of an apparatus, it is obvious that these aspects also represent a description of the corresponding method, such that a block or device of an apparatus also corresponds to a respective method step or a feature of a method step. Analogously, aspects described in the context of a method step also represent a description of a corresponding block or detail or feature of a corresponding apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Apparatus for controlling a switching DC-DC converter with a first half-bridge circuit comprising a first switch and a second switch, with a second half-bridge circuit comprising a third switch and a fourth switch and an inductance connected between the center taps of the first and the second half-bridge circuit, comprising:
 a control unit that is configured to adapt, in dependence on an input voltage and an output voltage at the switching DC-DC converter, a switching frequency of switches of the DC-DC converter, a first and a second duty cycle of the first and fourth switch and the time delay between switching on the first and fourth switch;
 wherein the control unit is further configured to determine the switching frequency, the first duty cycle, the second duty cycle and the time delay based on an output current of the switching DC-DC converter;
 wherein the control unit for adapting the first duty cycle is further configured to increase, starting from a first situation where the output voltage is lower than the input voltage, the first duty cycle at an increasing output voltage up to a maximum value when in a second situation the output voltage corresponds to the input voltage, and to decrease, starting from the second situation, the first duty cycle to a lesser extent at an increasing output voltage than at a decreasing output voltage;
 wherein the control unit for adapting the second duty cycle is further configured to decrease, starting from a third situation where the output voltage is greater than the input voltage, the second duty cycle at a decreasing output voltage up to a minimum value when in a second situation the output voltage corresponds to the input voltage;
 and to increase, starting from the second situation, the second duty cycle to a lesser extent at a decreasing output voltage than at an increasing output voltage;
 wherein the control unit for adapting the switching frequency is further configured to increase, starting from a second situation where the output voltage corresponds to the input voltage, the switching frequency at a decreasing or increasing output voltage until the output voltage has reached a reference value and to reduce the switching frequency when the output voltage has exceeded the reference value;
 wherein the control unit for adapting the time delay is further configured to determine the time delay in a range between 0 and a time difference between a first time period where the first switch is switched on within a period duration and a second time period where the fourth switch $S_4$ is switched on within the period duration, in dependence on an output current of the switching DC-DC converter; and to increase the time delay at a negative output current of the switching DC-DC converter when the amount of the output current increases and to reduce the time delay at a positive output current of the switching DC-DC converter when the amount of the output current increases
 or
 wherein the time delay can be represented as $t_v = \alpha T$, wherein $t_v$ is the time delay, $\alpha$ a time delay factor and T a period duration of a switching cycle of the switches of the switching DC-DC converter, and wherein the control unit is configured to reduce an amount value of the time delay factor a at an increasing or decreasing output voltage, starting from a range of the output voltage that comprises a second situation where the output voltage corresponds to the input voltage; to determine the amount value of the time delay factor in a range between 0 and 1, and to switch on the first switch at a positive output current of the switching DC-DC converter while the fourth switch is switched on and to reduce an amount of the time delay when the amount of the output current increases and wherein the control unit is configured to switch on the fourth switch at a negative output current of the switching DC-DC converter while the first switch is switched on and to increase the amount of the time delay when the amount of the output current increases.

2. Apparatus according to claim 1, wherein the control unit is configured to switch on the first switch, the second switch, the third switch and the fourth switch with differing time durations.

3. Apparatus according to claim 1, wherein the control unit is configured to switch on the fourth switch only in time intervals in which the first switch is switched on.

4. Apparatus according to claim 1, wherein the control unit is configured to determine the first duty cycle and the second duty cycle such that the following condition is fulfilled for the first duty cycle and for the second duty cycle:

$$\frac{U_A}{U_E} = \frac{D_1}{1 - D_2}$$

wherein describes the output voltage, the input voltage, the first duty cycle and the second duty cycle.

5. Apparatus according to claim 1, wherein the control unit is configured to control the switches of the switching DC-DC converter such that the second switch is switched off when the fourth switch is switched on.

6. Apparatus according to claim 1, wherein the control unit is configured to determine the first duty cycle and the second duty cycle such that the first duty cycle corresponds to the second duty cycle in each operating point of the switched DC-DC converter.

7. Apparatus according to claim 1, wherein the control unit is configured to determine the switching frequency in dependence on the input voltage.

27

8. Apparatus according to claim 1, wherein the control unit is configured to reduce the switching frequency at an increase of an amount of an output current of the switching DC-DC converter.

9. Apparatus according to claim 1 with a storage where the values for the switching frequency, the first and the second duty cycle and the time delay in dependence on the output voltage and the input voltage are stored, wherein the control unit is configured to adapt the switching frequency, the first and the second duty cycle and the time delay based on the stored values.

10. Switching DC-DC converter comprising
a first half-bridge circuit comprising a first switch and a second switch,
a second half-bridge circuit comprising a third switch and a fourth switch,
an inductance that is connected between the center taps of the first and the second half-bridge circuit; and
a driving unit that is configured to adapt, in dependence on an input voltage and an output voltage at the switching DC-DC converter, a switching frequency of the switches of the DC-DC converter, the duty cycles of the first and fourth switch and the time delay between switching on of the first and fourth switch;
wherein the driving unit is further configured to determine the switching frequency, the first duty cycle, the second duty cycle and the time delay based on an output current of the switching DC-DC converter;
wherein the driving unit for adapting the first duty cycle is further configured to increase, starting from a first situation where the output voltage is lower than the input voltage, the first duty cycle at an increasing output voltage up to a maximum value when in a second situation the output voltage corresponds to the input voltage, and to decrease, starting from the second situation, the first duty cycle to a lesser extent at an increasing output voltage than at a decreasing output voltage;
wherein the driving unit for adapting the second duty cycle is further configured to decrease, starting from a third situation where the output voltage is greater than the input voltage, the second duty cycle at a decreasing output voltage up to a minimum value when in a second situation the output voltage corresponds to the input voltage;
and to increase, starting from the second situation, the second duty cycle to a lesser extent at a decreasing output voltage than at an increasing output voltage;
wherein the driving unit for adapting the switching frequency is further configured to increase, starting from a second situation where the output voltage corresponds to the input voltage, the switching frequency at a decreasing or increasing output voltage until the output voltage has reached a reference value and to reduce the switching frequency when the output voltage has exceeded the reference value;
wherein the driving unit for adapting the time delay is further configured to determine the time delay in a range between 0 and a time difference between a first time period where the first switch is switched on within a period duration and a second time period where the fourth switch is switched on within the period duration, in dependence on an output current of the switching DC-DC converter; and to increase the time delay at a negative output current of the switching DC-DC converter when the amount of the output current increases and to reduce the time delay at a positive output current of the switching DC-DC converter when the amount of the output current increases or wherein the time delay can be represented as $t_v = \alpha T$, wherein $t_v$ is the time delay, $\alpha$ a time delay factor and T a period duration of a switching cycle of the switches of the switching DC-DC converter, and wherein the driving unit is configured to reduce an amount value of the time delay factor a at an increasing or decreasing output voltage, starting from a range of the output voltage that comprises a second situation where the output voltage corresponds to the input voltage; to determine the amount value of the time delay factor in a range between 0 and 1, and to switch on the first switch at a positive output current of the switching DC-DC converter while the fourth switch is switched on and to reduce an amount of the time delay when the amount of the output current increases and wherein the driving unit is configured to switch on the fourth switch at a negative output current of the switching DC-DC converter while the first switch is switched on and to increase the amount of the time delay when the amount of the output current increases.

11. Switching DC-DC converter according to claim 10, wherein the driving unit is configured to switch on the fourth switch only in time intervals in which the first switch is switched on.

12. Switching DC-DC converter according to claim 10, comprising a storage where values for the switching frequency, the first and second duty cycle and the time delay are stored in dependence on the output voltage and the input voltage.

13. Method for controlling a switched DC-DC converter comprising:
connecting a control unit and a switching DC-DC converter with a first half-bridge circuit comprising a first switch and a second switch, with a second half-bridge circuit comprising a third switch and a fourth switch, and an inductance that is connected between the center taps of the first and the second half-bridge circuit;
adapting a switching frequency of the switches of the DC-DC converter, the duty cycles of the first and fourth switch and the time delay between switching on the first and fourth switch in dependence on an input voltage and an output voltage at the switching DC-DC converter;
wherein adapting the switching frequency, the first duty cycle, the second duty cycle and the time delay is performed based on an output current of the switching DC-DC converter;
for adapting the first duty cycle, increasing, starting from a first situation where the output voltage is lower than the input voltage, increasing the first duty cycle at an increasing output voltage up to a maximum value when in a second situation the output voltage corresponds to the input voltage, and decreasing, starting from the second situation, the first duty cycle to a lesser extent at an increasing output voltage than at a decreasing output voltage;
for adapting the second duty cycle, decreasing, starting from a third situation where the output voltage is greater than the input voltage, the second duty cycle at a decreasing output voltage up to a minimum value when in a second situation the output voltage corresponds to the input voltage; and increasing, starting from the second situation, the second duty cycle to a lesser extent at a decreasing output voltage than at an increasing output voltage;

for adapting the switching frequency, increasing, starting from the second situation where the output voltage corresponds to the input voltage, the switching frequency at a decreasing or increasing output voltage until the output voltage has reached a reference value and decreasing the switching frequency when the output voltage has exceeded the reference value;

for adapting the time delay, determining the time delay in a range between 0 and a time difference between a first time period where the first switch is switched on within a period duration and a second time period where the fourth switch is switched on within the period duration in dependence on an output current of the switching DC-DC converter; and increasing the time delay at a negative output current of the switching DC-DC converter when the amount of the output current increases and reducing the time delay at a positive output current of the switching DC-DC converter when the amount of the output current increases or wherein the time delay can be represented as $t_v = \alpha T$, wherein $t_v$ is the time delay, $\alpha$ a time delay factor and T a period duration of a switching cycle of the switches of the switching DC-DC converter, and wherein for adapting the time delay, an amount value of the time delay factor is reduced at an increasing or decreasing output voltage, starting from a range of the output voltage that comprises a second situation where the output voltage corresponds to the input voltage; determining the amount value of the time delay factor in a range between 0 and 1; and switching on the first switch at a positive output current of the switching DC-DC converter while the fourth switch is switched on and reducing an amount of the time delay when the amount of the output current increases and switching on the fourth switch while the first switch is switched on and increasing the amount of the time delay when the amount of the output current increases.

* * * * *

UNITED STATES PATENT AND TRADEMARK OFFICE
CERTIFICATE OF CORRECTION

PATENT NO. : 10,298,131 B2
APPLICATION NO. : 15/952584
DATED : May 21, 2019
INVENTOR(S) : Zhe Yu et al.

Page 1 of 1

It is certified that error appears in the above-identified patent and that said Letters Patent is hereby corrected as shown below:

In the Claims

Column 26, Line 22:
In Claim 1, Please change "...the time delay factor a at an increasing or decreasing..."
To read:
--...the time delay factor α at an increasing or decreasing...--

Column 28, Line 8:
In Claim 10, Please change "...the time delay factor a at an increasing or decreasing..."
To read:
--...the time delay factor α at an increasing or decreasing...--

Signed and Sealed this
Twenty-fifth Day of August, 2020

Andrei Iancu
*Director of the United States Patent and Trademark Office*